(12) United States Patent
Tanaka et al.

(10) Patent No.: US 12,080,846 B2
(45) Date of Patent: *Sep. 3, 2024

(54) SOLID ELECTROLYTE MATERIAL AND BATTERY USING THE SAME

(71) Applicant: Panasonic Intellectual Property Management Co., Ltd., Osaka (JP)

(72) Inventors: Yoshiaki Tanaka, Kyoto (JP); Akihiro Sakai, Nara (JP); Tetsuya Asano, Nara (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 638 days.

This patent is subject to a terminal disclaimer.

(21) Appl. No.: 17/237,007

(22) Filed: Apr. 21, 2021

(65) Prior Publication Data

US 2021/0242494 A1 Aug. 5, 2021

Related U.S. Application Data

(63) Continuation of application No. PCT/JP2019/042903, filed on Oct. 31, 2019.

(30) Foreign Application Priority Data

| Dec. 28, 2018 | (JP) | ................................ | 2018-248585 |
| Dec. 28, 2018 | (JP) | ................................ | 2018-248586 |
| Aug. 30, 2019 | (JP) | ................................ | 2019-159080 |

(51) Int. Cl.
*H01M 10/0562* (2010.01)
*C01G 33/00* (2006.01)
*C01G 35/00* (2006.01)

(52) U.S. Cl.
CPC ...... *H01M 10/0562* (2013.01); *C01G 33/006* (2013.01); *C01G 35/006* (2013.01);
(Continued)

(58) Field of Classification Search
CPC ................................................. H01M 10/0562
See application file for complete search history.

(56) References Cited

U.S. PATENT DOCUMENTS

| 2004/0151986 A1 | 8/2004 | Park et al. |
| 2012/0301796 A1 | 11/2012 | Ohtomo et al. |

(Continued)

FOREIGN PATENT DOCUMENTS

| CN | 102780031 B | 3/2016 |
| CN | 107431242 A | 12/2017 |

(Continued)

OTHER PUBLICATIONS

International Search Report of PCT application No. PCT/JP2019/042903 dated Nov. 26, 2019.
English Translation of Chinese Search Report dated Jun. 10, 2023 for the related Chinese Patent Application No. 201980062289.0.
The Extended European Search Report dated Feb. 4, 2022 for the related European Patent Application No. 19901589.2.

(Continued)

*Primary Examiner* — Maria Laios
*Assistant Examiner* — Jordan E Berresford
(74) *Attorney, Agent, or Firm* — Rimon P.C.

(57) ABSTRACT

The present disclosure provides solid electrolyte materials having high lithium ion conductivity. A solid electrolyte material according to the present disclosure consists essentially of Li, M, O, and X. M is at least one element selected from the group consisting of Nb and Ta. X is at least one element selected from the group consisting of Cl, Br, and I.

17 Claims, 7 Drawing Sheets

(52) U.S. Cl.
CPC ...... *C01P 2002/50* (2013.01); *C01P 2002/72* (2013.01); *C01P 2006/32* (2013.01); *C01P 2006/40* (2013.01); *H01M 2300/008* (2013.01)

(56) References Cited

U.S. PATENT DOCUMENTS

| | | | |
|---|---|---|---|
| 2017/0162902 | A1 | 6/2017 | Ohta et al. |
| 2018/0076452 | A1 | 3/2018 | Sasaki et al. |
| 2018/0309167 | A1* | 10/2018 | Kaga ............... H01M 4/661 |
| 2021/0242494 | A1 | 8/2021 | Tanaka et al. |
| 2021/0249683 | A1 | 8/2021 | Tanaka et al. |

FOREIGN PATENT DOCUMENTS

| | | |
|---|---|---|
| JP | 10-316424 A | 12/1998 |
| JP | 2004-235155 | 8/2004 |
| JP | 2006-156284 A | 6/2006 |
| JP | 2011-014445 | 1/2011 |
| JP | 2011-129312 | 6/2011 |
| JP | 2012-054071 A | 3/2012 |
| JP | 2020-137153 A1 | 11/2021 |
| JP | 2020-137155 A1 | 11/2021 |

OTHER PUBLICATIONS

The Extended European Search Report dated Feb. 4, 2022 for the related European Patent Application No. 19904950.3.

Yongjia Zhang et al: "Magnetic Properties in ${\rm Li}_{1-{\rm x}}{\rm A}_{\rm x}{\rm NbO}_{3}$ (${\rm A}={\rm Ca}$, Sr, and Ba) and ${\rm LiNbO}_{3-{\rm y}}{\rm M}_{\rm y}$ (${\rm M}={\rm F}$, Cl, and Br) From First-Principles Study", IEEE Transactions on Magnetics, IEEE, USA, vol. 47, No. 10, Oct. 1, 2011 (Oct. 1, 2011), pp. 2916-2919, XP011383605.

Phraewphiphat Thanya et al: "Synthesis and Lithium-Ion Conductivity of LiSrB2O6F (B=Nb5+, Ta5+) with a Pyrochlore Structure", Journal of the Japan Society of Powder and Powder Metallurgy, Funtai Funmatsu Yakin Kyokai, JP vol. 65, No. 1 Feb. 3, 2018 (Feb. 3, 2018), pp. 26-33, XP009531967, ISSN: 0532-8799, DOI: 10.2497/JJSPM.65.26 Retrieved from the Internet: URL:https://www.jstage.jst.go.jp/article/jspm/65/1/65_26/_pdf/- char/en.

The Indian Office Action dated Jan. 24, 2023 for the related Indian Patent Application No. 202147018165.

English Translation of Chinese Search Report dated Aug. 6, 2023 for the related Chinese Patent Application No. 201980074838.6.

* cited by examiner

SOLID ELECTROLYTE MATERIAL AND BATTERY USING THE SAME

BACKGROUND

1. Technical Field

The present disclosure relates to a solid electrolyte material and a battery using the same.

2. Description of the Related Art

Japanese Unexamined Patent Application Publication No. 2011-129312 discloses an all-solid-state battery in which a sulfide solid electrolyte material is used.

SUMMARY

One non-limiting and exemplary embodiment provides a solid electrolyte material having high lithium ion conductivity.

In one general aspect, the techniques disclosed here feature a solid electrolyte material. The solid electrolyte material consists essentially of Li, M, O, and X, where M is at least one element selected from the group consisting of Nb and Ta, and X is at least one element selected from the group consisting of Cl, Br, and I.

The present disclosure provides solid electrolyte materials having high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
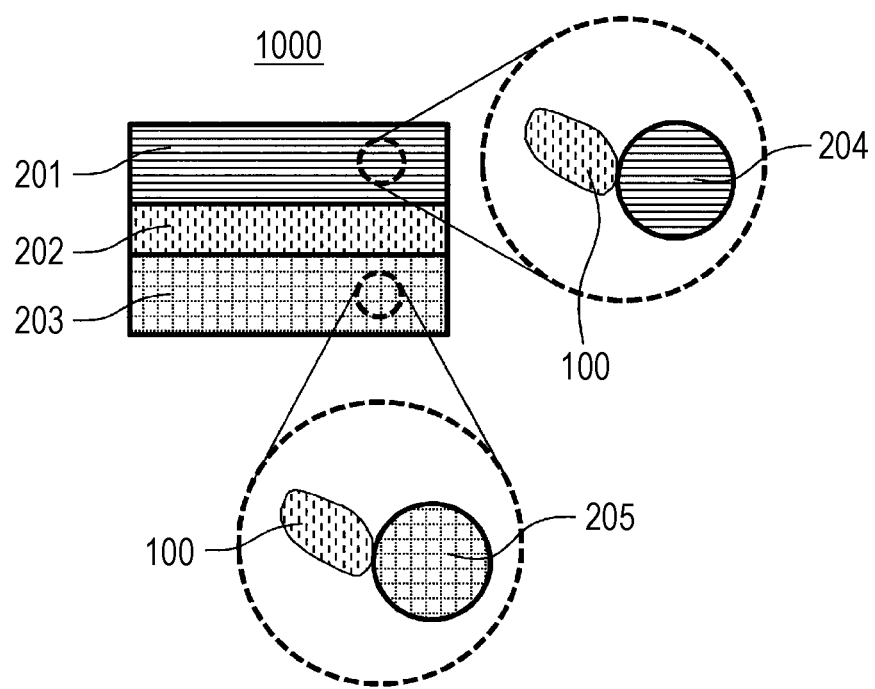
FIG. 1 is a cross-sectional view of a battery 1000 of a second embodiment.

Embodiments of the present disclosure will now be described with reference to the drawings.

First Embodiment

A solid electrolyte material of a first embodiment includes Li, M, O, and X. M is at least one element selected from the group consisting of Nb and Ta. X is at least one element selected from the group consisting of Cl, Br, and I. The solid electrolyte material of the first embodiment has high lithium ion conductivity.

The solid electrolyte material of the first embodiment may be used for obtaining a battery having excellent charge-discharge characteristics. An example of the battery is an all-solid-state secondary battery.

The solid electrolyte material of the first embodiment can maintain high lithium ion conductivity in an expected operating temperature range (e.g., a range of −30° ° C. to 80° C.) of a battery. Accordingly, a battery in which the solid electrolyte material of the first embodiment is used can stably operate even in an environment with temperature variations.

From the standpoint of safety, it is desirable that the solid electrolyte material of the first embodiment be free of sulfur. Solid electrolyte materials free of sulfur do not produce hydrogen sulfide even when the solid electrolyte materials are exposed to air, and, therefore, such solid electrolyte materials provide excellent safety. Note that when the sulfide solid electrolyte material disclosed in Japanese Unexamined Patent Application Publication No. 2011-129312 is exposed to air, hydrogen sulfide can be produced.

The solid electrolyte material of the first embodiment may consist essentially of Li. M, O, and X so that the ionic conductivity of the solid electrolyte material can be increased. "The solid electrolyte material of the first embodiment consists essentially of Li, M, O, and X" means that the molar ratio of the total moles of Li, M, O, and X to the total moles of all the elements that form the solid electrolyte material of the first embodiment is greater than or equal to 90%. For example, the molar ratio may be greater than or equal to 95%.

The solid electrolyte material of the first embodiment may consist of only Li, M, O, and X so that the ionic conductivity of the solid electrolyte material can be increased.

X may include iodine (i.e., I) so that the ionic conductivity of the solid electrolyte material can be increased. The molar ratio of I to X may be less than or equal to 30%.

In the solid electrolyte material of the first embodiment, X may be at least one element selected from the group consisting of Cl and Br so that the ionic conductivity of the solid electrolyte material can be increased.

X may include Cl so that the ionic conductivity of the solid electrolyte material can be increased.

Now, a first example and a second example of the solid electrolyte material of the first embodiment will be described. The first example of the solid electrolyte material of the first embodiment will be referred to as a "first solid electrolyte material". The second example of the solid electrolyte material of the first embodiment will be referred to as a "second solid electrolyte material".

First Solid Electrolyte Material

The first solid electrolyte material has a first crystalline phase, which corresponds to a peak in an X-ray diffraction pattern of the first solid electrolyte material obtained by an X-ray diffraction measurement with Cu-Kα radiation, the peak existing in at least one of a first range or a second range, the first range being a range of the diffraction angle 2θ of greater than or equal to 12.9° and less than or equal to 14.1°, and the second range being a range of the diffraction angle 2θ of greater than or equal to 24.0° and less than or equal to 25.8°. The first crystalline phase has high lithium ion conductivity. Because of the presence of the first crystalline phase, a path for diffusion of lithium ions is easily formed in the first solid electrolyte material. As a result, the first solid electrolyte material has high lithium ion conductivity.

The X-ray diffraction pattern may be obtained by conducting an X-ray diffraction measurement in a θ-2θ mode by using Cu-Kα radiation (wavelengths: 1.5405 Å and 1.5444 Å, that is, 0.15405 nm and 0.15444 nm).

The first solid electrolyte material may be used for obtaining a battery having excellent charge-discharge characteristics.

The diffraction angle of a diffraction peak in the X-ray diffraction pattern is defined as the angle at which a maximum intensity is exhibited for a projecting portion having a full width at half maximum of 10° or less, provided that an SN ratio (i.e., the ratio of a signal S to a background noise N) is 3 or greater. The full width at half maximum is a width defined by the difference between two diffraction angles at which the intensity is half of $I_{MAX}$, where $I_{MAX}$ is the maximum intensity of a diffraction peak.

In the X-ray diffraction pattern of the first solid electrolyte material, the peak may exist in both the first range and the second range. In this instance, the first crystalline phase has a higher lithium ion conductivity. Accordingly, the first solid electrolyte material having the first crystalline phase has a higher lithium ion conductivity.

The first solid electrolyte material may additionally have a second crystalline phase, which is different from the first crystalline phase, so that the ionic conductivity of the solid electrolyte material can be further increased. That is, the first solid electrolyte material may additionally have a second crystalline phase corresponding to a peak that exists at a different diffraction angle 2θ from that of the peak of the first crystalline phase. In instances where the second crystalline phase is present in the first solid electrolyte material, the conduction of lithium ions in the first crystalline phase can be facilitated. As a result, the first solid electrolyte material has a higher lithium ion conductivity.

The second crystalline phase may intervene in the first crystalline phase.

A molar ratio Li/M, which is a molar ratio of Li to M, may be greater than or equal to 1.0 and less than or equal to 2.0 so that the ionic conductivity of the solid electrolyte material can be increased. The selection of the value of the molar ratio Li/M optimizes a Li concentration.

A molar ratio O/X, which is a molar ratio of O to X, may be greater than or equal to 0.1 and less than or equal to 0.25 so that the ionic conductivity of the solid electrolyte material can be increased. The selection of the value of the molar ratio O/X can facilitate the realization of the first crystalline phase.

Second Solid Electrolyte Material

The second solid electrolyte material has a third crystalline phase, which corresponds to a peak in an X-ray diffraction pattern of the second solid electrolyte material obtained by an X-ray diffraction measurement with Cu-Kα radiation, the peak existing in a third range, and the third range being a range of the diffraction angle 2θ of greater than or equal to 12.3° and less than or equal to 15.3°. The third crystalline phase has high ionic conductivity. Because of the presence of the third crystalline phase, a path for diffusion of lithium ions is easily formed in the second solid electrolyte material. As a result, the second solid electrolyte material has high lithium ion conductivity.

The X-ray diffraction pattern of the second solid electrolyte material can be measured in a manner similar to that for the X-ray diffraction pattern of the first solid electrolyte material.

The second solid electrolyte material may be used for obtaining a battery having excellent charge-discharge characteristics.

The definition of the diffraction angle of a peak in the X-ray diffraction pattern of the second solid electrolyte material is the same as that for the first solid electrolyte material.

The second solid electrolyte material may additionally have a fourth crystalline phase, which is different from the third crystalline phase, so that the ionic conductivity of the solid electrolyte material can be further increased. That is, the second solid electrolyte material may additionally have a fourth crystalline phase corresponding to a peak that exists at a different diffraction angle 2θ from that of the peak of the third crystalline phase. In instances where the fourth crystalline phase is present in the second solid electrolyte material, the conduction of lithium ions in the third crystalline phase can be facilitated. As a result, the second solid electrolyte material has a higher lithium ion conductivity.

The fourth crystalline phase may intervene in the third crystalline phase.

The second solid electrolyte material may be a material represented by composition formula (1) below.

$$Li_xMO_yX_{(5+x-2y)} \quad (1)$$

Here, the following relationships are satisfied:

0.1<x<7.0, and 0.4<y<1.9.

Solid electrolyte materials represented by composition formula (1) have high lithium ion conductivity.

The following relationships may be satisfied so that the ionic conductivity of the solid electrolyte material can be further increased:

0.2≤x≤6.0, and 0.5≤y≤1.8.

A relationship of 0.5≤x≤2.0 may be satisfied so that the ionic conductivity of the solid electrolyte material can be further increased. Desirably, a relationship of 0.9≤x≤1.1 may be satisfied.

The element X may be partially lost. Specifically, the compositional ratio of the element X may be less than the value (i.e., "(5+x−2y)" in composition formula (1)) estimated from the molar ratios of the raw materials of the solid electrolyte material. For example, an amount of loss of the element X is less than or equal to 30% of 5+x−2y.

O (i.e., oxygen) may also be partially lost.

In instances where the element X or O is partially lost, interaction between lithium ions and anions is reduced, and, therefore, the lithium ion conductivity is further improved.

There are no limitations on a shape of the solid electrolyte material of the first embodiment. Examples of the shape include acicular shapes, spherical shapes, and ellipsoidal shapes. The solid electrolyte material of the first embodiment may be particles. The solid electrolyte material of the first embodiment may be formed to have a pellet shape or a plate shape.

When the shape of the solid electrolyte material of the first embodiment is a particulate shape (e.g., a spherical shape), the solid electrolyte material may have a median diameter of greater than or equal to 0.1 μm and less than or equal to 100 μm or a median diameter of greater than or equal to 0.5 μm and less than or equal to 10 μm. In these cases, the solid electrolyte material of the first embodiment has a higher ionic conductivity. In addition, the solid electrolyte material of the first embodiment and other materials can be favorably dispersed.

The "median diameter of the particles" refers to a particle diameter (d50) corresponding to a cumulative volume of 50% in a volume-based particle size distribution. The volume-based particle size distribution can be measured by using a laser diffraction analyzer or an image analyzer.

When the shape of the solid electrolyte material of the first embodiment is a particulate shape (e.g., a spherical shape), the solid electrolyte material may have a smaller median diameter than an active material. In this case, the solid electrolyte material of the first embodiment and the active material can form a favorable state of dispersion.

Method for Producing Solid Electrolyte Material

The solid electrolyte material of the first embodiment can be produced by using the method described below.

Raw material powders are prepared in a manner such that a target composition is achieved. Examples of the raw material powders include those of oxides, hydroxides, halides, and acid halides.

For example, in the case of a solid electrolyte material formed of Li, Nb, O, and Cl, in an instance where the molar ratio Li/M and the molar ratio O/X at the time of mixing the raw materials are to be 2.0 and 0.2, respectively, $Li_2O$ and $NbCl_5$ are prepared in a molar ratio of 1:1. The elemental species of M and X are determined by the selection of the types of the raw material powders. The molar ratios Li/M and O/X are determined by the selection of the mixing ratio between the raw material powders.

For another example, in an instance where the target composition is $LiNbOCl_4$ (in composition formula (1), the values of x and y are equal to 1.0 and 1.0, respectively), LiCl and $NbOCl_3$ are prepared in a molar ratio of 1:1. The elemental species of M and X are determined by the selection of the types of the raw material powders. The values of x and y in composition formula (1) are determined by the selection of the mixing ratio between the raw material powders.

The mixture of the raw material powders may be reacted mechanochemically (i.e., by using a mechanochemical milling method) in a mixing apparatus, such as a planetary ball mill, to form a reaction product. The reaction product may be fired in a vacuum or in an inert atmosphere (e.g., an argon atmosphere or a nitrogen atmosphere). Alternatively, the mixture may be fired in a vacuum or in an inert gas atmosphere to form a reaction product. By using any of these methods, the solid electrolyte material of the first embodiment can be obtained.

The selection of raw material powders, a mixing ratio between the raw material powders, and reaction conditions enables the solid electrolyte material of the first embodiment to have a target X-ray diffraction peak position (i.e., a crystal structure).

The composition of the solid electrolyte material is determined, for example, by using an ICP emission spectrometry method, an ion chromatography method, an inert gas fusion-infrared absorption method, or an EPMA (Electron Probe Micro Analysis) method. However, the oxygen content may include an error of approximately 10% due to low measurement accuracy.

Second Embodiment

Now, a second embodiment will be described. Descriptions that are the same as those provided in the first embodiment may be omitted where appropriate.

A battery of the second embodiment includes a positive electrode, an electrolyte layer, and a negative electrode. The electrolyte layer is disposed between the positive electrode and the negative electrode. At least one selected from the group consisting of the positive electrode, the negative electrode, and the electrolyte layer includes the solid electrolyte material of the first embodiment. The battery of the second embodiment has excellent charge-discharge characteristics.

FIG. 1 is a cross-sectional view of a battery 1000 of the second embodiment.

The battery 1000 includes a positive electrode 201, an electrolyte layer 202, and a negative electrode 203. The electrolyte layer 202 is disposed between the positive electrode 201 and the negative electrode 203.

The positive electrode 201 includes positive electrode active material particles 204 and solid electrolyte particles 100.

The electrolyte layer 202 includes an electrolyte material (e.g., a solid electrolyte material).

The negative electrode 203 includes negative electrode active material particles 205 and the solid electrolyte particles 100.

The solid electrolyte particles 100 are particles including the solid electrolyte material of the first embodiment. The solid electrolyte particles 100 may be particles including the solid electrolyte material of the first embodiment as a major component. The "particles including the solid electrolyte material of the first embodiment as a major component" refers to particles in which the component present in the largest amount is the solid electrolyte material of the first embodiment. The solid electrolyte particles 100 may be particles consisting of the solid electrolyte material of the first embodiment.

The positive electrode 201 includes a material capable of occluding and releasing metal ions (e.g., lithium ions). The positive electrode 201 includes, for example, a positive electrode active material (e.g., the positive electrode active material particles 204).

Examples of the positive electrode active material include lithium transition metal oxides, transition metal fluorides, polyanionic materials, fluorinated polyanionic materials, transition metal sulfides, transition metal oxysulfides, and transition metal oxynitrides. Examples of the lithium transition metal oxides include $Li(NiCoAl)O_2$, $Li(NiCoMn)O_2$, and $LiCoO_2$.

For reasons associated with the cost and safety of the battery, lithium phosphate may be used as a positive electrode active material.

In instances where the positive electrode 201 includes a solid electrolyte material of the first embodiment in which X includes I (i.e., iodine), lithium iron phosphate may be used as a positive electrode active material. A solid electrolyte material of the first embodiment that contains I is susceptible to oxidation. In instances where lithium iron phosphate is used as a positive electrode active material, an oxidation reaction of the solid electrolyte material is inhibited. That is, formation of an oxidation layer having low lithium ion conductivity is inhibited. As a result, the battery has high charge-discharge efficiency.

The positive electrode 201 may include, in addition to the solid electrolyte material of the first embodiment, a transition metal oxyfluoride, which serves as a positive electrode active material. The solid electrolyte material of the first embodiment is not susceptible to the formation of a resistance layer even when the solid electrolyte material is fluorinated by the transition metal oxyfluoride. As a result, the battery has high charge-discharge efficiency.

The transition metal oxyfluoride contains oxygen and fluorine. For example, the transition metal oxyfluoride may be a compound represented by a composition formula of $Li_pMe_qO_mF_n$. Here, Me is at least one element selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P, and the following relationships are satisfied: $0.5 \leq p \leq 1.5$, $0.5 \leq q \leq 1.0$, $1 \leq m < 2$, and $0 < n \leq 1$. An example of such a transition metal oxyfluoride is $Li_{1.05}(Ni_{0.35}Co_{0.35}Mn_{0.3})_{0.95}O_{1.9}F_{0.1}$.

The positive electrode active material particles 204 may have a median diameter of greater than or equal to 0.1 μm and less than or equal to 100 μm. When the positive electrode active material particles 204 have a median diameter of greater than or equal to 0.1 μm, the positive electrode active material particles 204 and the solid electrolyte particles 100 can form a favorable state of dispersion in the positive electrode 201. Consequently, the charge-discharge characteristics of the battery are improved. When the positive electrode active material particles 204 have a median diameter of less than or equal to 100 μm, a lithium diffusion rate in the positive electrode active material particles 204 is improved. As a result, the battery can operate with a high output.

The positive electrode active material particles 204 may have a larger median diameter than the solid electrolyte particles 100. In this case, the positive electrode active material particles 204 and the solid electrolyte particles 100 can form a favorable state of dispersion.

In the positive electrode 201, a ratio of a volume of the positive electrode active material particles 204 to a sum of the volume of the positive electrode active material particles 204 and a volume of the solid electrolyte particles 100 may be greater than or equal to 0.30 and less than or equal to 0.95 for reasons associated with the energy density and output of the battery.

Figure 2:
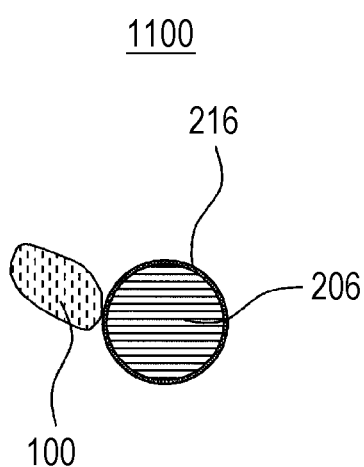
FIG. 2 is a cross-sectional view of an electrode material 1100 of the second embodiment.

FIG. 2 is a cross-sectional view of an electrode material 1100 of the second embodiment. The electrode material 1100 is included, for example, in the positive electrode 201. Electrode active material particles 206 may have a coating layer 216, which is formed on a surface thereof, so as to prevent the electrode active material particles 206 from reacting with the solid electrolyte particles 100. In this case, an increase in the reaction overvoltage of the battery is inhibited. Examples of a coating material that is included in the coating layer 216 include sulfide solid electrolytes, oxide solid electrolytes, and halide solid electrolytes.

When the solid electrolyte particles 100 are those of a sulfide solid electrolyte, the coating material may be a solid electrolyte material of the first embodiment in which X is at least one element selected from the group consisting of Cl and Br. Such a solid electrolyte material of the first embodiment is less susceptible to oxidation than a sulfide solid electrolyte. As a result, an increase in the reaction overvoltage of the battery is inhibited.

When the solid electrolyte particles 100 are those of a solid electrolyte material of the first embodiment in which X includes I, the coating material may be a solid electrolyte material of the first embodiment in which X is at least one element selected from the group consisting of Cl and Br. A solid electrolyte material of the first embodiment that does not contain I is less susceptible to oxidation than a solid electrolyte material of the first embodiment that contains I. Consequently, the battery has high charge-discharge efficiency.

When the solid electrolyte particles 100 are those of a solid electrolyte material of the first embodiment in which X includes I, the coating material may include an oxide solid electrolyte. The oxide solid electrolyte may be lithium niobate, which exhibits excellent stability even at a high potential. In this case, the battery has high charge-discharge efficiency.

The positive electrode 201 may be formed of a first positive electrode layer, which includes a first positive electrode active material, and a second positive electrode layer, which includes a second positive electrode active material. In this instance, the second positive electrode layer is disposed between the first positive electrode layer and the electrolyte layer 202, the first positive electrode layer and the second positive electrode layer include a solid electrolyte material of the first embodiment that contains I, and the second positive electrode active material has the coating layer 216 formed on a surface thereof. With this configuration, oxidation of the solid electrolyte material of the first embodiment included in the electrolyte layer 202, which may otherwise be caused by the second positive electrode active material, is inhibited. As a result, the battery has a high charge capacity. Examples of a coating material that is included in the coating layer 216 include sulfide solid electrolytes, oxide solid electrolytes, solid polymer electrolytes, and halide solid electrolytes. It is to be noted that when the coating material is a halide solid electrolyte, the halogen element does not include I. The first positive electrode active material may be the same material as that of the second positive electrode active material or a different material from that of the second positive electrode active material.

For reasons associated with the energy density and output of the battery, the positive electrode 201 may have a thickness of greater than or equal to 10 μm and less than or equal to 500 μm.

The electrolyte layer 202 includes an electrolyte material. For example, the electrolyte material is a solid electrolyte material. The electrolyte layer 202 may be a solid electrolyte layer. The solid electrolyte material included in the electrolyte layer 202 may include the solid electrolyte material of the first embodiment. The solid electrolyte material included in the electrolyte layer 202 may consist of only the solid electrolyte material of the first embodiment.

The solid electrolyte material included in the electrolyte layer 202 may be formed of only a solid electrolyte material different from the solid electrolyte material of the first embodiment. Examples of the solid electrolyte material different from the solid electrolyte material of the first embodiment include $Li_2MgX'_4$, $Li_2FeX'_4$, $Li(Al, Ga, In)X'_4$, $Li_3(Al, Ga, In)X'_6$, and LiI. Here, X' is at least one element selected from the group consisting of F, Cl, Br, and I.

The electrolyte layer 202 may include the solid electrolyte material of the first embodiment and, in addition, a solid electrolyte material different from the solid electrolyte material of the first embodiment.

The electrolyte layer 202 may have a thickness of greater than or equal to 1 μm and less than or equal to 100 μm. When the electrolyte layer 202 has a thickness of greater than or equal to 1 μm, short-circuiting between the positive electrode 201 and the negative electrode 203 tends not to occur. When the electrolyte layer 202 has a thickness of less than or equal to 100 μm, the battery can operate with a high output.

The negative electrode 203 includes a material capable of occluding and releasing metal ions (e.g., lithium ions). The negative electrode 203 includes, for example, a negative electrode active material (e.g., the negative electrode active material particles 205).

Examples of the negative electrode active material include metal materials, carbon materials, oxides, nitrides, tin compounds, and silicon compounds. The metal materials may be elemental metals or alloys. Examples of the metal materials include lithium metals and lithium alloys. Examples of the carbon materials include natural graphite, coke, partially-graphitized carbon, carbon fibers, spherical carbon, artificial graphite, and amorphous carbon. For reasons associated with a capacity density, suitable examples of the negative electrode active material include silicon (i.e., Si), tin (i.e., Sn), silicon compounds, and tin compounds.

The negative electrode active material may be selected based on a reduction resistance of the solid electrolyte material that is included in the negative electrode 203. In instances where the negative electrode 203 includes the solid electrolyte material of the first embodiment, the negative electrode active material to be used may be a material capable of occluding and releasing lithium ions at 0.27 V or greater vs. lithium. When the negative electrode active material is such a material, reduction of the solid electrolyte material of the first embodiment included in the negative electrode 203 is inhibited. As a result, the battery has high charge-discharge efficiency. Examples of the material include titanium oxide, indium metal, and lithium alloys. Examples of the titanium oxide include $Li_4Ti_5O_{12}$, $LiTi_2O_4$, and $TiO_2$.

The negative electrode active material particles 205 may have a median diameter of greater than or equal to 0.1 μm and less than or equal to 100 μm. When the negative electrode active material particles 205 have a median diameter of greater than or equal to 0.1 μm, the negative electrode active material particles 205 and the solid electrolyte particles 100 can form a favorable state of dispersion in the negative electrode 203. Consequently, the charge-discharge characteristics of the battery are improved. When the negative electrode active material particles 205 have a median diameter of less than or equal to 100 μm, a lithium diffusion rate in the negative electrode active material particles 205 is improved. Consequently, the battery can operate with a high output.

The negative electrode active material particles 205 may have a larger median diameter than the solid electrolyte particles 100. In this case, the negative electrode active material particles 205 and the solid electrolyte particles 100 can form a favorable state of dispersion.

In the negative electrode 203, a ratio of a volume of the negative electrode active material particles 205 to a sum of the volume of the negative electrode active material particles 205 and a volume of the solid electrolyte particles 100 may be greater than or equal to 0.30 and less than or equal to 0.95 for reasons associated with the energy density and output of the battery.

The electrode material 1100 illustrated in FIG. 2 may be included in the negative electrode 203. The electrode active material particles 206 may have the coating layer 216, which is formed on a surface thereof, so as to prevent the solid electrolyte particles 100 from reacting with the negative electrode active material (i.e., the electrode active material particles 206). In this case, the battery has high charge-discharge efficiency. Examples of a coating material that is included in the coating layer 216 include sulfide solid electrolytes, oxide solid electrolytes, solid polymer electrolytes, and halide solid electrolytes.

When the solid electrolyte particles 100 are those of the solid electrolyte material of the first embodiment, the coating material may be a sulfide solid electrolyte, an oxide solid electrolyte, or a solid polymer electrolyte. Examples of the sulfide solid electrolyte include $Li_2S$—$P_2S_5$. Examples of the oxide solid electrolyte include lithium phosphate. Examples of the solid polymer electrolyte include composite compounds of a polyethylene oxide and a lithium salt. Examples of such solid polymer electrolytes include lithium bis(trifluoromethanesulfonyl)imide.

For reasons associated with the energy density and output of the battery, the negative electrode 203 may have a thickness of greater than or equal to 10 μm and less than or equal to 500 μm.

At least one selected from the positive electrode 201, the electrolyte layer 202, and the negative electrode 203 may include a solid electrolyte material different from the solid electrolyte material of the first embodiment, so that ionic conductivity can be increased. Examples of the solid electrolyte material different from the solid electrolyte material of the first embodiment include sulfide solid electrolytes, oxide solid electrolytes, halide solid electrolytes, and solid organic polymer electrolytes.

In the present disclosure, the "sulfide solid electrolyte" refers to a solid electrolyte containing sulfur. The "oxide solid electrolyte" refers to a solid electrolyte containing oxygen. The oxide solid electrolyte may contain anions (excluding sulfur anions and halogen anions) in addition to oxygen anions. The "halide solid electrolyte" refers to a solid electrolyte containing a halogen element and not containing sulfur. The halide solid electrolyte may contain oxygen in addition to a halogen element.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

Examples of the oxide solid electrolyte include
(i) NASICON-type solid electrolytes, such as $LiTi_2(PO_4)_3$ and element-substituted derivatives thereof,
(ii) perovskite-type solid electrolytes, such as $(LaLi)TiO_3$,
(iii) LISICON-type solid electrolytes, such as $Li_{14}ZnGe_4O_{16}$, $Li_4SiO_4$, $LiGeO_4$, and element-substituted derivatives thereof,
(iv) garnet-type solid electrolytes, such as $Li_7La_3Zr_2O_{12}$ and element-substituted derivatives thereof, and
(v) $LisPO_4$ and N-substituted derivatives thereof.

Examples of the halide solid electrolyte material include compounds represented by $Li_aMe'_bY_cZ_6$. Here, the following relationships are satisfied: a+mb+3c=6, and c>0. Me' is at least one selected from the group consisting of metalloid elements and metal elements other than Li or Y. Z is at least one element selected from the group consisting of F, Cl, Br, and I. The value of m represents the valence of Me'.

The "metalloid elements" are B, Si, Ge, As, Sb, and Te.
The "metal elements" are all the elements (excluding hydrogen) from Group 1 to Group 12 of the periodic table and all the elements (excluding B, Si, Ge, As, Sb, Te, C, N, P, O, S and Se) from Group 13 to Group 16 of the periodic table.

Me' may be at least one element selected from the group consisting of Mg, Ca, Sr, Ba, Zn, Sc, Al, Ga, Bi, Zr, Hf, Ti, Sn, Ta, and Nb.

Examples of the halide solid electrolyte include $Li_3YCl_6$ and $Li_3YBr_6$.

When the electrolyte layer 202 includes the solid electrolyte material of the first embodiment, the negative electrode 203 may include a sulfide solid electrolyte material. In this case, the sulfide solid electrolyte material, which is electrochemically stable with respect to the negative electrode active material, inhibits the solid electrolyte material of the first embodiment and the negative electrode active material from coming into contact with each other. As a result, an internal resistance of the battery is reduced.

Examples of the solid organic polymer electrolyte material include compounds of a polymeric compound and a lithium salt. The polymeric compound may have an ethylene oxide structure. Polymeric compounds having an ethylene oxide structure can contain large amounts of a lithium salt and, therefore, have a higher ionic conductivity.

Examples of the lithium salt include $LiPF_6$, $LiBF_4$, $LiSbF_6$, $LiAsF_6$, $LiSO_3CF_3$, $LIN(SO_2CF_3)_2$, $LIN(SO_2C_2F_5)_2$, $LIN(SO_2CF_3)(SO_2C_4F_9)$, and $LiC(SO_2CF_3)_3$. One lithium salt selected from these may be used alone. Alternatively, a mixture of two or more lithium salts selected from these may be used.

At least one selected from the group consisting of the positive electrode 201, the electrolyte layer 202, and the negative electrode 203 may include a non-aqueous electrolyte solution, a gel electrolyte, or an ionic liquid so that the transfer of lithium ions can be facilitated to improve the output characteristics of the battery.

The non-aqueous electrolyte solution includes a non-aqueous solvent and a lithium salt dissolved in the non-aqueous solvent. Examples of the non-aqueous solvent include cyclic carbonate solvents, chain carbonate solvents, cyclic ether solvents, chain ether solvents, cyclic ester solvents, chain ester solvents, and fluorinated solvents. Examples of the cyclic carbonate solvents include ethylene carbonate, propylene carbonate, and butylene carbonate. Examples of the chain carbonate solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorinated solvents include fluoroethylene carbonate, fluoromethyl propionate, fluorobenzene, fluoroethyl methyl carbonate, and fluorodimethylene carbonate. One non-aqueous solvent selected from these may be used alone. Alternatively, a mixture of two or more non-aqueous solvents selected from these may be used.

Examples of the lithium salt include $LiPF_6$, $LiBF_4$, $LiSbF_6$, $LiAsF_6$, $LiSO_3CF_3$, $LIN(SO_2CF_3)_2$, $LIN(SO_2C_2F_5)_2$, $LIN(SO_2CF_3)(SO_2C_4F_9)$, and $LiC(SO_2CF_3)_3$. One lithium salt selected from these may be used alone. Alternatively, a mixture of two or more lithium salts selected from these may be used. A concentration of the lithium salt is in a range of, for example, greater than or equal to 0.5 mol/liter and less than or equal to 2 mol/liter.

The gel electrolyte may be a polymeric material impregnated with a non-aqueous electrolyte solution. Examples of the polymeric material include polyethylene oxide, polyacrylonitrile, polyvinylidene fluoride, polymethylmethacrylate, and polymers having an ethylene oxide linkage.

Examples of a cation that is included in the ionic liquid include (i) aliphatic chain quaternary salts, such as tetraalkylammonium and tetraalkylphosphonium, (ii) aliphatic cyclic ammoniums, such as pyrrolidiniums, morpholiniums, imidazoliniums, tetrahydropyrimidiniums, piperaziniums, and piperidiniums, and (iii) nitrogen-containing heterocyclic aromatic cations, such as pyridiniums and imidazoliums.

Examples of an anion that is included in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$.

The ionic liquid may contain a lithium salt.

At least one selected from the positive electrode 201, the electrolyte layer 202, and the negative electrode 203 may include a binding agent so that adhesion between particles can be improved.

Examples of the binding agent include polyvinylidene fluoride, polytetrafluoroethylene, polyethylene, polypropylene, aramid resins, polyamides, polyimides, polyamide-imides, polyacrylonitrile, polyacrylic acids, poly(methyl acrylate), poly(ethyl acrylate), poly(hexyl acrylate), polymethacrylic acids, poly(methyl methacrylate), poly(ethyl methacrylate), poly(hexyl methacrylate), polyvinyl acetate, polyvinylpyrrolidone, polyethers, polyether sulfones, hexafluoropolypropylene, styrene butadiene rubber, and carboxymethyl cellulose. The binding agent may be a copolymer. Examples of such a binding agent include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acids, and hexadiene. A mixture of two or more selected from these materials may be used.

At least one selected from the positive electrode 201 and the negative electrode 203 may include a conductive additive so that electron conductivity can be increased.

Examples of the conductive additive include (i) graphites, such as natural graphite and artificial graphite, (ii) carbon blacks, such as acetylene black and Ketjen black, (iii) conductive fibers, such as carbon fiber and metal fiber, (iv) carbon fluoride, (v) metal powders, such as those of aluminum, (vi) conductive whiskers, such as those of zinc oxide and those of potassium titanate, (vii) conductive metal oxides, such as titanium oxide, and (viii) conductive polymeric compounds, such as polyaniline, polypyrrole, and polythiophene.

A conductive additive listed under (i) or (ii) may be used so that a cost reduction can be achieved.

Examples of a shape of the battery of the second embodiment include coin shapes, cylindrical shapes, prismatic shapes, sheet shapes, button shapes, flat shapes, and stack shapes.

EXAMPLES

The present disclosure will be described in more detail with reference to First Example and Second Example.

First Example

Sample 1-1

Preparation of Solid Electrolyte Material

In a dry atmosphere with a dew point of −30° ° C. or lower (hereinafter referred to as a "dry atmosphere"), raw material powders of $Li_2O$ and $NbCl_5$ were prepared in a molar ratio $Li_2O:NbCl_5$ of 1:1. The raw material powders were ground and mixed in a mortar to obtain a mixed powder. The obtained mixed powder was milled in a planetary ball mill at 600 rpm for 24 hours. In this manner, a powder of a solid electrolyte material of sample 1-1 was obtained; the solid electrolyte material had a crystalline phase formed of Li, Nb, O, and Cl. In the solid electrolyte material of sample 1-1, the molar ratio Li/Nb was 2.0, and the molar ratio O/Cl was 0.2.

Evaluation of Ionic Conductivity

Figure 3:
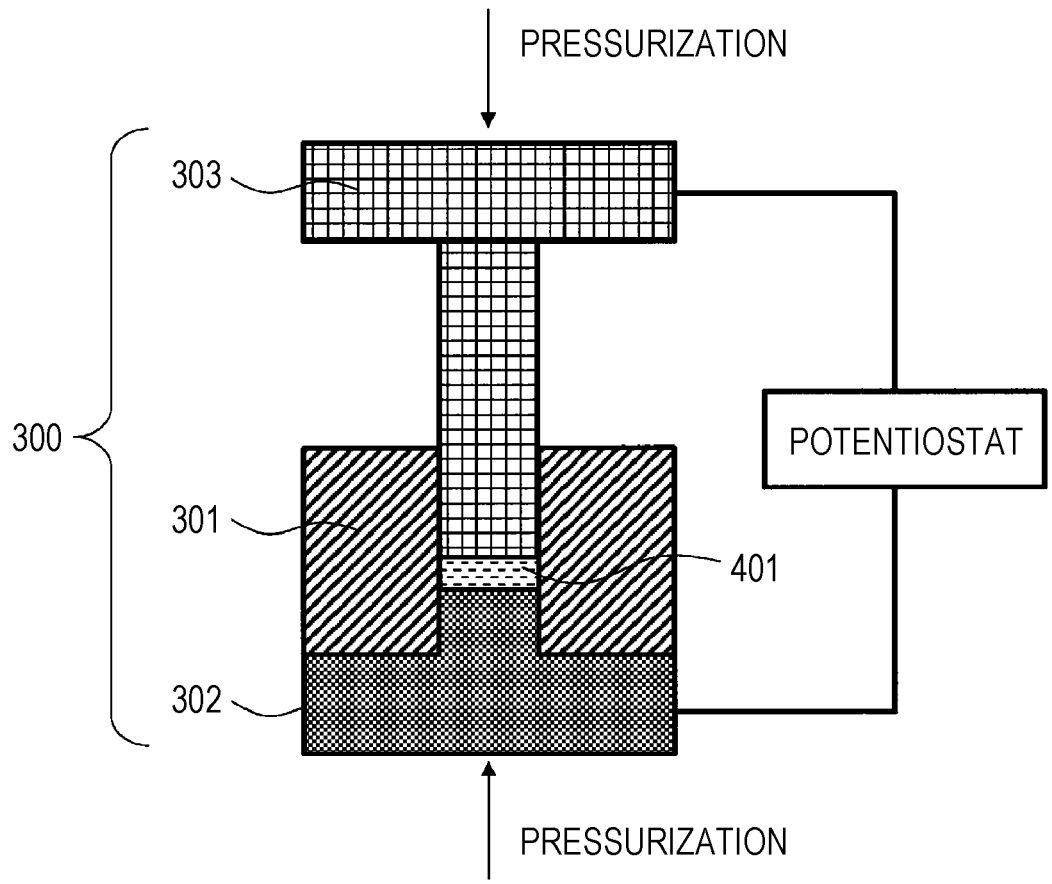
FIG. 3 is a schematic diagram of a pressure-molding die 300, which is used for evaluating the ionic conductivity of a solid electrolyte material.

FIG. 3 is a schematic diagram of a pressure-molding die 300, which was used for evaluating the ionic conductivity of the solid electrolyte material.

The pressure-molding die 300 included a frame 301, a lower punch 302, and an upper punch 303. The frame 301 was formed of polycarbonate, which has an insulating property. The upper punch 303 and the lower punch 302 were both formed of stainless steel, which is electronically conductive.

By using the pressure-molding die 300 illustrated in FIG. 3, the ionic conductivity of the solid electrolyte material of sample 1-1 was measured in the following manner.

In a dry atmosphere, the powder of the solid electrolyte material of sample 1-1 (i.e., a powder 401 of the solid electrolyte material as illustrated in FIG. 3) was filled into the interior of the pressure-molding die 300. In the interior of the pressure-molding die 300, a pressure of 300 MPa was applied to the solid electrolyte material of sample 1-1 with the lower punch 302 and the upper punch 303. In this manner, an ionic conductivity measurement cell of sample 1-1 was obtained.

In the state in which the pressure was applied, the lower punch 302 and the upper punch 303 were connected to a potentiostat (VersaSTAT 4, Princeton Applied Research) equipped with a frequency response analyzer. The upper punch 303 was connected to a working electrode and a potential measurement terminal. The lower punch 302 was connected to a counter electrode and a reference electrode. By using an electrochemical impedance measurement method, the ionic conductivity of the solid electrolyte material of sample 1-1 was measured at room temperature. The result was that the ionic conductivity, measured at 22° C., was 2.2 mS/cm.

Evaluation of Temperature Stability of Ionic Conductivity

Figure 4:
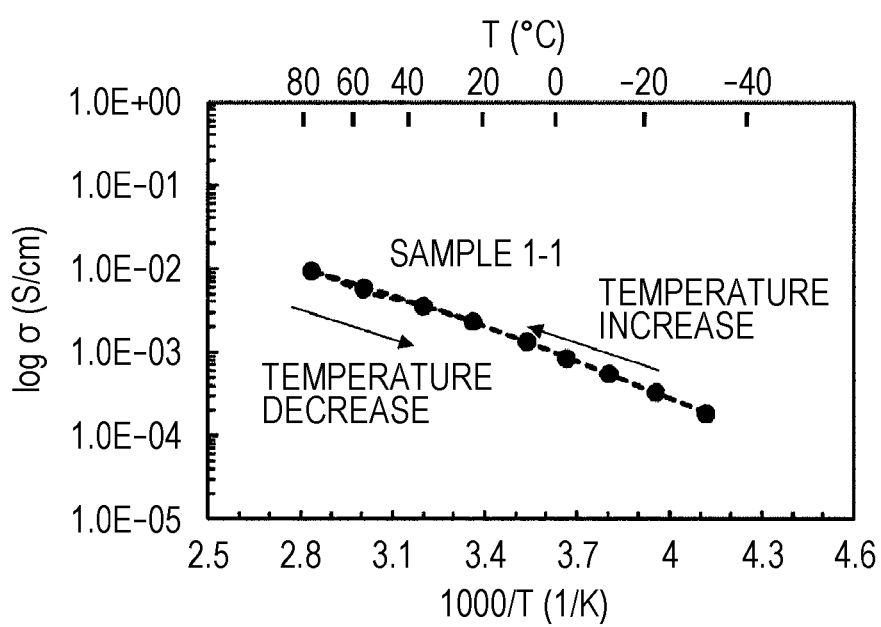
FIG. 4 is a graph illustrating the temperature dependence of the ionic conductivity of a solid electrolyte material of sample 1-1.

FIG. 4 is a graph illustrating the temperature dependence of the ionic conductivity of the solid electrolyte material of sample 1-1. The result shown in FIG. 4 was obtained from a measurement conducted in the following manner.

The ionic conductivity measurement cell of sample 1-1 was placed in a constant-temperature bath. Over a range of −30° C. to 80° C., the ionic conductivity was measured in both a temperature increasing process and a temperature decreasing process.

As illustrated in FIG. 4, in the range of −30° C. to 80° C., the solid electrolyte material of sample 1-1 maintained high lithium ion conductivity, with no observed abrupt changes in the ionic conductivity.

X-Ray Diffraction

Figure 5:
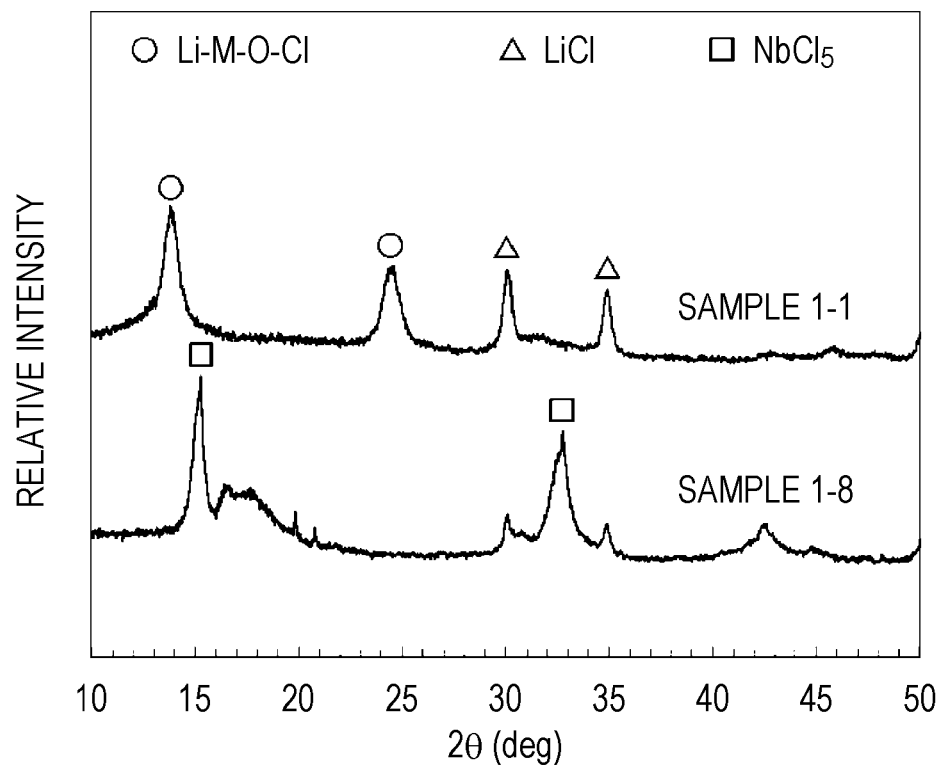
FIG. 5 is a graph illustrating X-ray diffraction patterns of solid electrolyte materials of samples 1-1 and 1-8.

FIG. 5 is a graph illustrating an X-ray diffraction pattern of the solid electrolyte material of sample 1-1. The result shown in FIG. 5 was obtained from a measurement conducted in the following manner.

In a dry atmosphere with a dew point of −45° C. or lower, an X-ray diffraction pattern of the solid electrolyte material of sample 1-1 was measured by using an X-ray diffractometer (MiniFlex600, Rigaku Corporation). The X-ray source used was Cu-Kα radiation (wavelengths: 1.5405 Å and 1.5444 Å).

The solid electrolyte material of sample 1-1 had diffraction peaks at 13.8° (i.e., in the first range) and 24.5° (i.e., in the second range). Hence, the solid electrolyte material of sample 1-1 had a first crystalline phase, which has high lithium ion conductivity.

The solid electrolyte material of sample 1-1 also had a diffraction peak attributable to LiCl. Hence, the solid electrolyte material of sample 1-1 also had a second crystalline phase, which was different from the first crystalline phase.

Preparation of Battery

In an argon atmosphere with a dew point of −60° C. or lower (hereinafter referred to as a "dry argon atmosphere"), the solid electrolyte material of sample 1-1 and $LiCoO_2$, which was a positive electrode active material, were prepared in a volume ratio of 50:50. The materials were mixed in a mortar to obtain a mixture.

In an insulating tube having an inside diameter of 9.5 mm, the solid electrolyte material of sample 1-1 (100 mg) and the mixture (10.8 mg) were layered sequentially to obtain a multilayer body. A pressure of 360 MPa was applied to the multilayer body to form a solid electrolyte layer and a positive electrode. The solid electrolyte layer had a thickness of 500 μm.

Next, a Li—In alloy having a thickness of 200 μm was layered onto the solid electrolyte layer to obtain a multilayer body. A pressure of 80 MPa was applied to the multilayer body to form a negative electrode.

A current collector formed of stainless steel was attached to the positive electrode and the negative electrode, and a current collector lead was attached to the current collector.

Lastly, the interior of the insulating tube was blocked from the ambient atmosphere by using an insulating ferrule, to hermetically seal the interior of the tube.

In this manner, a battery of sample 1-1 was obtained.

Charge-Discharge Test

Figure 8:
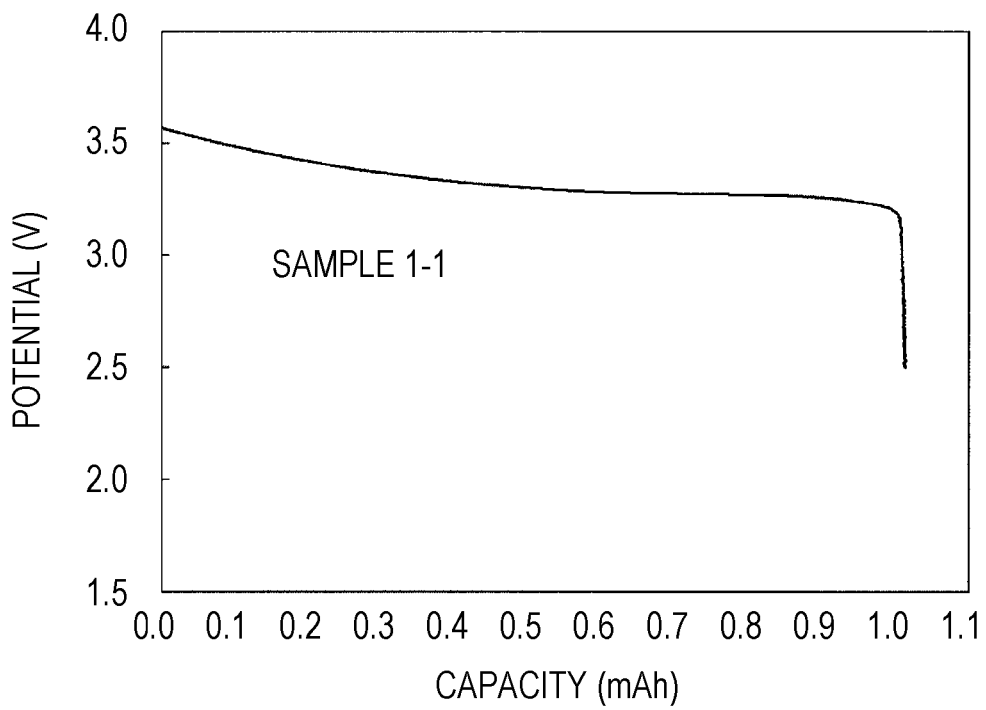
FIG. 8 is a graph illustrating initial discharge characteristics of a battery of sample 1-1.

FIG. 8 is a graph illustrating initial discharge characteristics of the battery of sample 1-1. The result shown in FIG. 8 was obtained from a measurement conducted in the following manner.

The battery of sample 1-1 was placed in a constant-temperature bath at 25° C.

The battery of sample 1-1 was charged at a current density of 80 μA/cm² until a voltage of 3.6 V was reached. The current density corresponds to a C rate of 0.05. Next, the battery of sample 1-1 was discharged at a current density of 80 μA/cm² until a voltage of 2.5 V was reached. The current density corresponds to a C rate of 0.05.

The result of the charge-discharge test was that the battery of sample 1-1 had an initial discharge capacity of 1.01 mAh.

Sample 1-2

Raw material powders of $Li_2O$, $NbCl_5$, and $NbOCl_3$ were prepared in a molar ratio $Li_2O:NbCl_5:NbOCl_3$ of 1:1:1.

Except for this difference, a similar procedure to that for sample 1-1 was performed, and, accordingly, a solid electrolyte material of sample 1-2 was obtained. In the solid electrolyte material of sample 1-2, the molar ratio Li/Nb was 1.0, and the molar ratio O/Cl was 0.25.

The ionic conductivity of the solid electrolyte material of sample 1-2 was measured in a manner similar to that for sample 1-1. The result was that the ionic conductivity, measured at 22° C., was 0.65 mS/cm.

Figure 6:
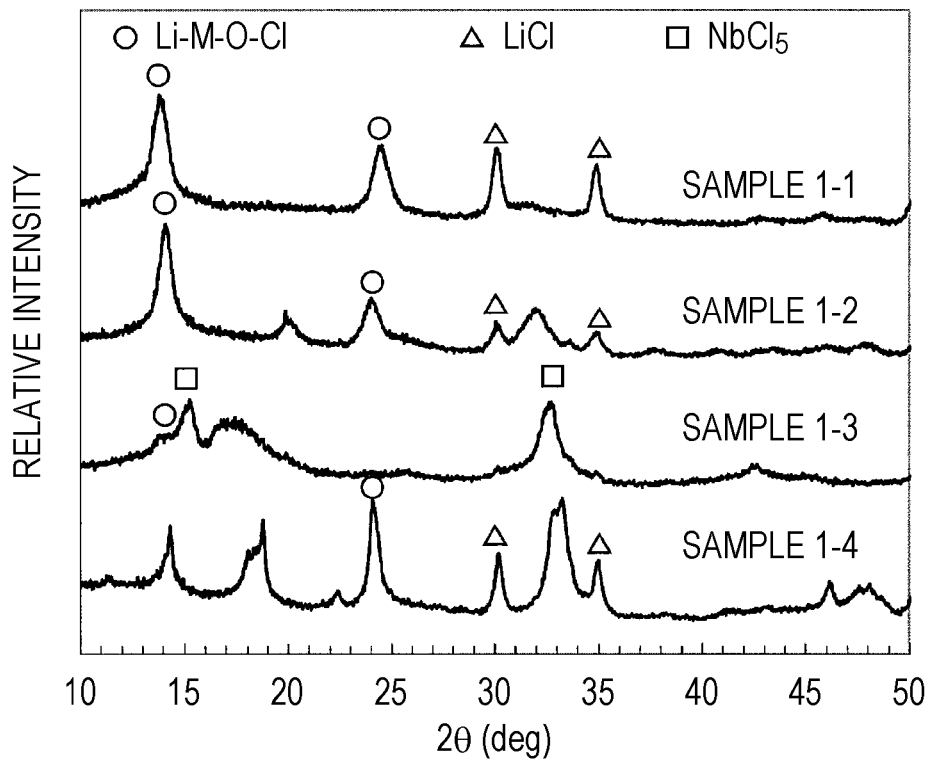
FIG. 6 is a graph illustrating X-ray diffraction patterns of solid electrolyte materials of samples 1-1 to 1-4.

The X-ray diffraction of the solid electrolyte material of sample 1-2 was measured in a manner similar to that for sample 1-1. The result of the measurement is shown in FIG. 6. The solid electrolyte material of sample 1-2 had diffraction peaks at 14.1° (i.e., in the first range) and 24.0° (i.e., in the second range). In addition, the solid electrolyte material of sample 1-2 had a diffraction peak attributable to LiCl. Hence, the solid electrolyte material of sample 1-2 had a first crystalline phase and a second crystalline phase.

Sample 1-3

Raw material powders of $Li_2O$ and $NbCl_5$ were prepared in a molar ratio $Li_2O:NbCl_5$ of 1:2. Except for this difference, a similar procedure to that for sample 1-1 was performed, and, accordingly, a solid electrolyte material of sample 1-3 was obtained. In the solid electrolyte material of sample 1-3, the molar ratio Li/Nb was 1.0, and the molar ratio O/Cl was 0.1.

The ionic conductivity of the solid electrolyte material of sample 1-3 was measured in a manner similar to that for sample 1-1. The result was that the ionic conductivity, measured at 22° C., was $1.4 \times 10^{-3}$ mS/cm.

The X-ray diffraction of the solid electrolyte material of sample 1-3 was measured in a manner similar to that for sample 1-1. The result of the measurement is shown in FIG. 6. The solid electrolyte material of sample 1-3 had a diffraction peak at 14.1° (i.e., in the first range). In addition, the solid electrolyte material of sample 1-3 had a diffraction peak attributable to $NbCl_5$. Hence, the solid electrolyte material of sample 1-3 had a first crystalline phase and a second crystalline phase.

Sample 1-4

A mixed powder of raw material powders was obtained in a manner similar to that for sample 1-1. The mixed powder was fired in an argon atmosphere at 300° C. for 12 hours. In this manner, a solid electrolyte material of sample 1-4 was obtained. In the solid electrolyte material of sample 1-4, the molar ratio Li/Nb was 2.0, and the molar ratio O/Cl was 0.20.

The ionic conductivity of the solid electrolyte material of sample 1-4 was measured in a manner similar to that for sample 1-1. The result was that the ionic conductivity, measured at 22° C., was 7.0×10−2 mS/cm.

The X-ray diffraction of the solid electrolyte material of sample 1-4 was measured in a manner similar to that for sample 1-1. The result of the measurement is shown in FIG. 6. The solid electrolyte material of sample 1-4 had a diffraction peak at 24.0° (i.e., in the first range). In addition, the solid electrolyte material of sample 1-4 had a diffraction peak attributable to LiCl. Hence, the solid electrolyte material of sample 1-4 had a first crystalline phase and a second crystalline phase.

Sample 1-5

A mixed powder of raw material powders was obtained in a manner similar to that for sample 1-1. The mixed powder was milled at 300 rpm for 24 hours. In this manner, a solid electrolyte material of sample 1-5 was obtained. In the solid electrolyte material of sample 1-5, the molar ratio Li/Nb was 2.0, and the molar ratio O/Cl was 0.20.

The ionic conductivity of the solid electrolyte material of sample 1-5 was measured in a manner similar to that for sample 1-1. The result was that the ionic conductivity, measured at 22° C., was 0.37 mS/cm.

Figure 7:
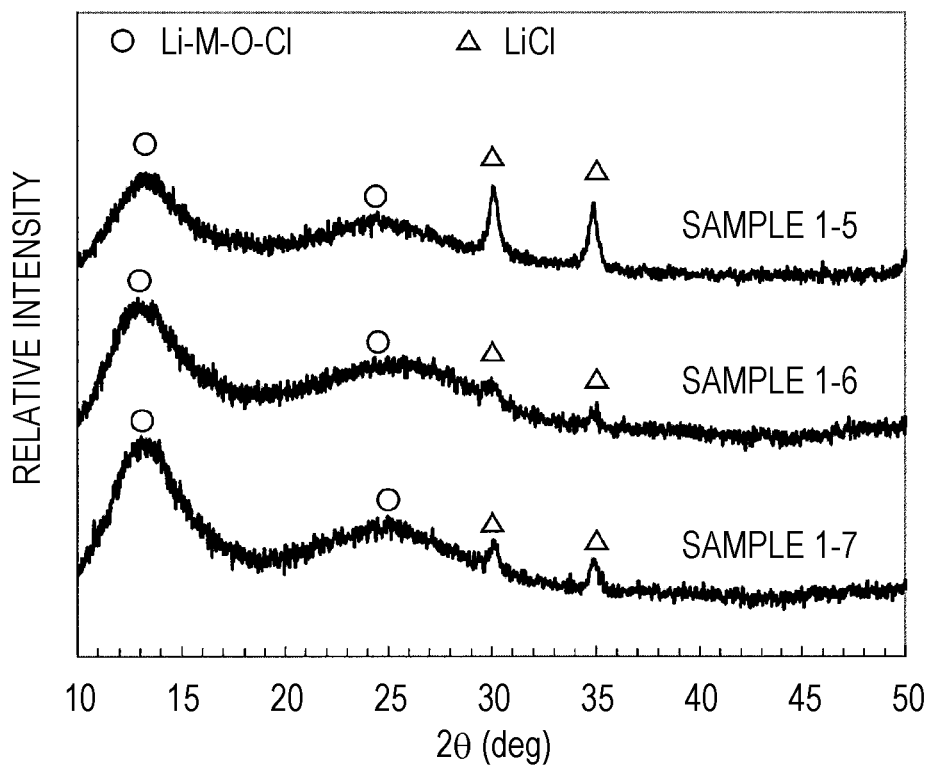
FIG. 7 is a graph illustrating X-ray diffraction patterns of solid electrolyte materials of samples 1-5 to 1-7.

The X-ray diffraction of the solid electrolyte material of sample 1-5 was measured in a manner similar to that for sample 1-1. The result of the measurement is shown in FIG. 7. The solid electrolyte material of sample 1-5 had diffraction peaks at 13.3° (i.e., in the first range) and 24.5° (i.e., in the second range). In addition, the solid electrolyte material of sample 1-5 had a diffraction peak attributable to LiCl. Hence, the solid electrolyte material of sample 1-5 had a first crystalline phase and a second crystalline phase.

Sample 1-6

Raw material powders of LiOH and $TaCl_5$ were prepared in a molar ratio $LiOH:TaCl_5$ of 1:1. Except for this difference, a similar procedure to that for sample 1-1 was performed, and, accordingly, a solid electrolyte material of sample 1-6 was obtained. In the solid electrolyte material of sample 1-6, the molar ratio Li/Ta was 1.0, and the molar ratio O/Cl was 0.25.

The ionic conductivity of the solid electrolyte material of sample 1-6 was measured in a manner similar to that for sample 1-1. The result was that the ionic conductivity, measured at 22° C., was 3.0 mS/cm.

The X-ray diffraction of the solid electrolyte material of sample 1-6 was measured in a manner similar to that for sample 1-1. The result of the measurement is shown in FIG. 7. The solid electrolyte material of sample 1-6 had diffraction peaks at 12.9° (i.e., in the first range) and 25.8° (i.e., in the second range). In addition, the solid electrolyte material of sample 1-6 had a diffraction peak attributable to LiCl. Hence, the solid electrolyte material of sample 1-6 had a first crystalline phase and a second crystalline phase.

Sample 1-7

Raw material powders of LiOH, $NbCl_5$, and $TaCl_5$ were prepared in a molar ratio $LiOH:NbCl_5:TaCl_5$ of 2:1:1. Except for this difference, a similar procedure to that for sample 1-1 was performed, and, accordingly, a solid electrolyte material of sample 1-7 was obtained. In the solid electrolyte material of sample 1-7, the molar ratio Li/(Nb, Ta) was 1.0, and the molar ratio O/Cl was 0.25.

The ionic conductivity of the solid electrolyte material of sample 1-7 was measured in a manner similar to that for sample 1-1. The result was that the ionic conductivity, measured at 22° C., was 2.0 mS/cm.

The X-ray diffraction of the solid electrolyte material of sample 1-7 was measured in a manner similar to that for sample 1-1. The result of the measurement is shown in FIG. 7. The solid electrolyte material of sample 1-7 had diffraction peaks at 13.1° (i.e., in the first range) and 25.0° (i.e., in the second range). In addition, the solid electrolyte material of sample 1-7 had a diffraction peak attributable to LiCl. Hence, the solid electrolyte material of sample 1-7 had a first crystalline phase and a second crystalline phase.

Sample 1-8

Raw material powders of LiCl and $NbCl_5$ were prepared in a molar ratio $LiCl:NbCl_5$ of 1:1. Except for this difference, a similar procedure to that for sample 1-1 was performed, and, accordingly, a solid electrolyte material of sample 1-8 was obtained. In the solid electrolyte material of sample 1-8, the molar ratio Li/Nb was 1.0, and the molar ratio O/Cl was 0.0.

The ionic conductivity of the solid electrolyte material of sample 1-8 was measured in a manner similar to that for sample 1-1. The result was that the ionic conductivity, measured at 22° C., was $9.5 \times 10^{-5}$ mS/cm.

The X-ray diffraction of the solid electrolyte material of sample 1-8 was measured in a manner similar to that for sample 1-1. The result of the measurement is shown in FIG. 5. The solid electrolyte material of sample 1-8 did not have a diffraction peak either in the first range or in the second range.

Table 1 shows the constituent elements, the molar ratio, and the measurement results of the solid electrolyte materials of samples 1-1 to 1-8.

TABLE 1

| | Constituent elements | Molar ratio Li/M | Molar ratio O/X | Diffraction peak angle in first range | Diffraction peak angle in second range | Ionic conductivity (mS/cm) |
|---|---|---|---|---|---|---|
| Sample 1-1 | Li, Nb, O, Cl | 2.0 | 0.2 | 13.8° | 24.5° | 2.2 |
| Sample 1-2 | Li, Nb, O, Cl | 1.0 | 0.25 | 14.1° | 24.0° | 0.65 |
| Sample 1-3 | Li, Nb, O, Cl | 1.0 | 0.1 | 14.1° | — | $1.4 \times 10^{-3}$ |
| Sample 1-4 | Li, Nb, O, Cl | 2.0 | 0.2 | — | 24.0° | $7.0 \times 10^{-2}$ |
| Sample 1-5 | Li, Nb, O, Cl | 2.0 | 0.2 | 13.3° | 24.5° | 0.37 |
| Sample 1-6 | Li, Ta, O, Cl | 1.0 | 0.25 | 12.9° | 25.8° | 3.0 |
| Sample 1-7 | Li, Nb, Ta, O, Cl | 1.0 | 0.25 | 13.1° | 25.0° | 2.0 |
| Sample 1-8 | Li, Nb, Cl | 1.0 | 0 | — | — | $9.5 \times 10^{-5}$ |

Discussion

As is apparent from Table 1, the solid electrolyte materials of sample 1-1 to sample 1-7 have a high ionic conductivity of greater than or equal to $1 \times 10^{-3}$ mS/cm at room temperature. The solid electrolyte materials of samples 1-1 to 1-7 have a higher ionic conductivity than the solid electrolyte material of sample 1-8.

As is apparent from a comparison of samples 1-2 and 1-3 with sample 1-8, when the molar ratio O/X is greater than or equal to 0.1 and less than or equal to 0.25, the solid electrolyte material has a high ionic conductivity. As is apparent from a comparison of sample 1-2 with sample 1-3, when the molar ratio O/X is 0.25, the ionic conductivity is even higher.

As is apparent from a comparison of samples 1-1, 1-2, and 1-5 to 1-7 with samples 1-3 and 1-4, regarding the X-ray diffraction patterns, the solid electrolyte materials having peaks in both the first range and the second range have a higher ionic conductivity than the solid electrolyte materials having a peak in only one of the first range and the second range.

As is apparent from a comparison of samples 1-6 and 1-7 with sample 1-2, in instances where M includes Ta, the solid electrolyte material has a higher ionic conductivity.

As illustrated in FIG. 4, the solid electrolyte material of sample 1-1 maintained high lithium ion conductivity in an expected operating temperature range of the battery.

The battery of sample 1-1 was charged and discharged at room temperature.

Second Example

Sample 2-1

Preparation of Solid Electrolyte Material

In a dry atmosphere, raw material powders of LiCl and NbOCl$_3$ were prepared in a molar ratio LiCl:NbOCl$_3$ of 1:1. The raw material powders were ground and mixed in a mortar to obtain a mixed powder. The obtained mixed powder was milled in a planetary ball mill at 600 rpm for 24 hours. In this manner, a powder of a solid electrolyte material of sample 2-1 was obtained; the solid electrolyte material had a crystalline phase formed of Li, Nb, O, and Cl. The values of x and y were 1.0 and 1.0, respectively.

Evaluation of Ionic Conductivity

The ionic conductivity of the solid electrolyte material of sample 2-1 was measured in a manner similar to that for sample 1-1. The result was that the ionic conductivity, measured at 22° C., was 5.70 mS/cm.

Evaluation of Temperature Stability of Ionic Conductivity

Figure 9:
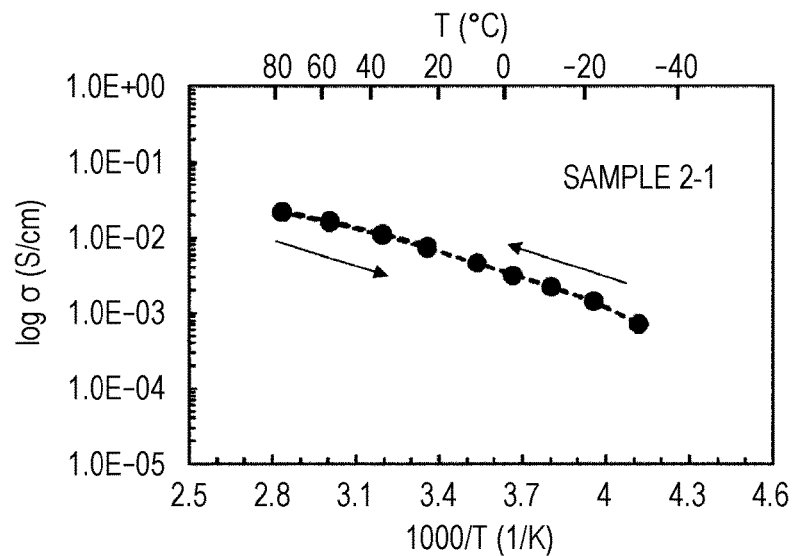
FIG. 9 is a graph illustrating the temperature dependence of the ionic conductivity of a solid electrolyte material of sample 2-1.

FIG. 9 is a graph illustrating the temperature dependence of the ionic conductivity of the solid electrolyte material of sample 2-1. The result shown in FIG. 9 was obtained from a measurement conducted in a manner similar to that for sample 1-1.

As illustrated in FIG. 9, in the range of −30° C. to 80° C., the solid electrolyte material of sample 2-1 maintained high lithium ion conductivity, with no observed abrupt changes in the ionic conductivity.

X-Ray Diffraction

Figure 10:
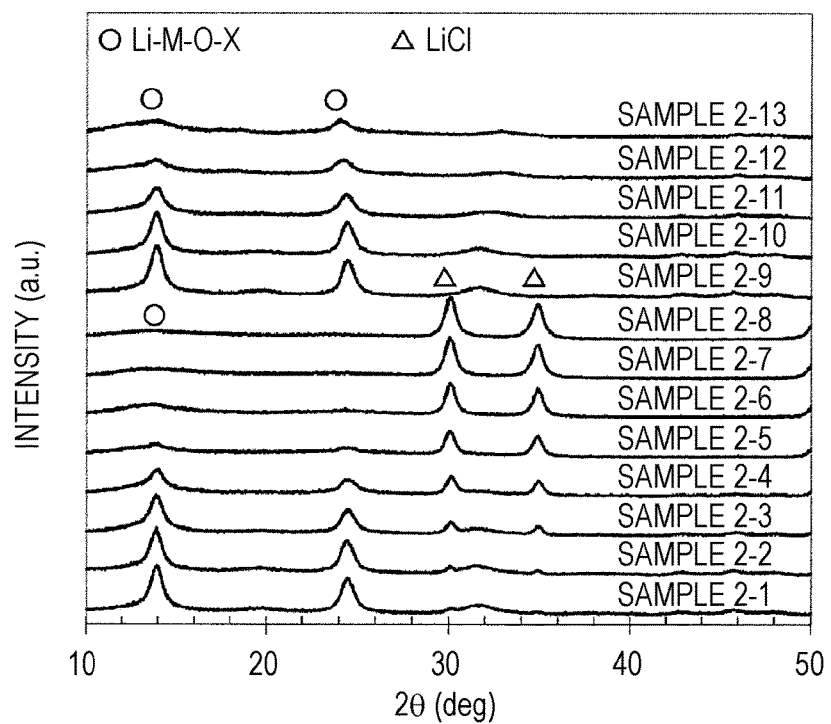
FIG. 10 is a graph illustrating X-ray diffraction patterns of solid electrolyte materials of samples 2-1 to 2-13.

FIG. 10 is a graph illustrating an X-ray diffraction pattern of the solid electrolyte material of sample 2-1. In the measurement of the X-ray diffraction, an experiment similar to that for sample 1-1 was conducted.

The solid electrolyte material of sample 2-1 had a diffraction peak at 13.9° (i.e., in the third range). Hence, the solid electrolyte material of sample 2-1 had a third crystalline phase, which has high lithium ion conductivity.

The solid electrolyte material of sample 2-1 also had a diffraction peak attributable to LiCl. Hence, the solid electrolyte material of sample 2-1 also had a fourth crystalline phase, which was different from the third crystalline phase.

Preparation of Battery

In a dry argon atmosphere, the solid electrolyte material of sample 2-1 and LiCoO$_2$, which was a positive electrode active material, were prepared in a volume ratio of 50:50. The materials were mixed in a mortar to obtain a mixture.

In an insulating tube having an inside diameter of 9.5 mm, the solid electrolyte material of sample 2-1 (100 mg) and the mixture (10.6 mg) were layered sequentially to obtain a multilayer body. A pressure of 360 MPa was applied to the multilayer body to form a solid electrolyte layer and a positive electrode. The solid electrolyte layer had a thickness of 500 μm.

Except for the difference described above, a similar procedure to that for sample 1-1 was performed, and, accordingly, a battery of sample 2-1 was obtained.

Charge-Discharge Test

Figure 13:
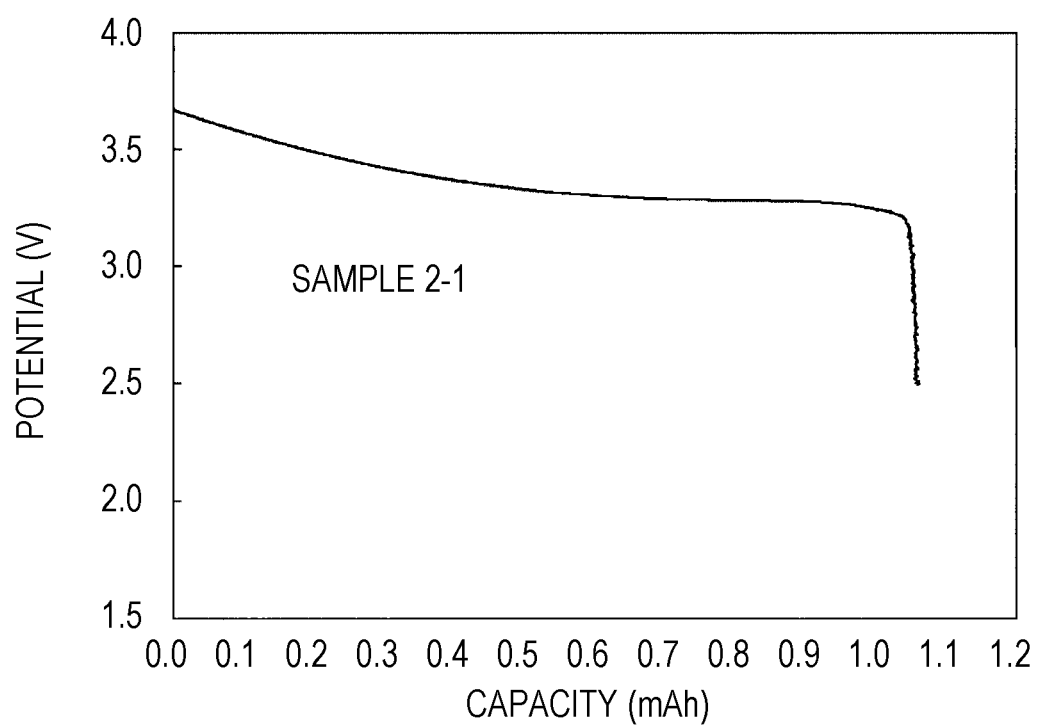
FIG. 13 is a graph illustrating initial discharge characteristics of a battery of sample 2-1.

FIG. 13 is a graph illustrating initial discharge characteristics of the battery of sample 2-1. The result shown in FIG. 13 was obtained from a measurement conducted in the following manner.

The battery of sample 2-1 was placed in a constant-temperature bath at 25° C.

The battery of sample 2-1 was charged at a current density of 80 μA/cm$^2$ until a voltage of 3.6 V was reached. The current density corresponds to a C rate of 0.05. Next, the battery of sample 2-1 was discharged at a current density of 80 μA/cm$^2$ until a voltage of 2.5 V was reached. The current density corresponds to a C rate of 0.05.

The result of the charge-discharge test was that the battery of sample 2-1 had an initial discharge capacity of 1.06 mAh.

Sample 2-2

Raw material powders of LiCl and NbOCl$_3$ were prepared in a molar ratio LiCl:NbOCl$_3$ of 1.1:1. Except for this difference, a similar procedure to that for sample 2-1 was performed, and, accordingly, a solid electrolyte material of sample 2-2 was obtained.

The ionic conductivity of the solid electrolyte material of sample 2-2 was measured in a manner similar to that for sample 1-1. The result was that the ionic conductivity, measured at 22° C., was 5.23 mS/cm.

The X-ray diffraction of the solid electrolyte material of sample 2-2 was measured in a manner similar to that for sample 1-1. The result of the measurement is shown in FIG. 10. The solid electrolyte material of sample 2-2 had a diffraction peak at 13.9° (i.e., in the third range). In addition, the solid electrolyte material of sample 2-2 had a diffraction peak attributable to LiCl. Hence, the solid electrolyte material of sample 2-2 had a third crystalline phase and a fourth crystalline phase.

Sample 2-3

Raw material powders of LiCl and NbOCl$_3$ were prepared in a molar ratio LiCl:NbOCl$_3$ of 1.5:1. Except for this difference, a similar procedure to that for sample 2-1 was performed, and, accordingly, a solid electrolyte material of sample 2-3 was obtained.

The ionic conductivity of the solid electrolyte material of sample 2-3 was measured in a manner similar to that for sample 1-1. The result was that the ionic conductivity, measured at 22° C., was 3.25 mS/cm.

The X-ray diffraction of the solid electrolyte material of sample 2-3 was measured in a manner similar to that for sample 1-1. The result of the measurement is shown in FIG. 10. The solid electrolyte material of sample 2-3 had a diffraction peak at 13.9° (i.e., in the third range). In addition, the solid electrolyte material of sample 2-3 had a diffraction peak attributable to LiCl. Hence, the solid electrolyte material of sample 2-3 had a third crystalline phase and a fourth crystalline phase.

Sample 2-4

Raw material powders of LiCl and NbOCl$_3$ were prepared in a molar ratio LiCl:NbOCl$_3$ of 2:1. Except for this difference, a similar procedure to that for sample 2-1 was performed, and, accordingly, a solid electrolyte material of sample 2-4 was obtained.

The ionic conductivity of the solid electrolyte material of sample 2-4 was measured in a manner similar to that for sample 1-1. The result was that the ionic conductivity, measured at 22° C., was 1.73 mS/cm.

The X-ray diffraction of the solid electrolyte material of sample 2-4 was measured in a manner similar to that for sample 1-1. The result of the measurement is shown in FIG. 10. The solid electrolyte material of sample 2-4 had a diffraction peak at 14.0° (i.e., in the third range). In addition, the solid electrolyte material of sample 2-4 had a diffraction peak attributable to LiCl. Hence, the solid electrolyte material of sample 2-4 had a third crystalline phase and a fourth crystalline phase.

Sample 2-5

Raw material powders of LiCl and NbOCl$_3$ were prepared in a molar ratio LiCl:NbOCl$_3$ of 3:1. Except for this difference, a similar procedure to that for sample 2-1 was performed, and, accordingly, a solid electrolyte material of sample 2-5 was obtained.

The ionic conductivity of the solid electrolyte material of sample 2-5 was measured in a manner similar to that for sample 1-1. The result was that the ionic conductivity, measured at 22° C., was 0.44 mS/cm.

The X-ray diffraction of the solid electrolyte material of sample 2-5 was measured in a manner similar to that for sample 1-1. The result of the measurement is shown in FIG. 10. The solid electrolyte material of sample 2-5 had a diffraction peak at 14.0° (i.e., in the third range). In addition, the solid electrolyte material of sample 2-5 had a diffraction peak attributable to LiCl. Hence, the solid electrolyte material of sample 2-5 had a third crystalline phase and a fourth crystalline phase.

Sample 2-6

Raw material powders of LiCl and NbOCl$_3$ were prepared in a molar ratio LiCl:NbOCl$_3$ of 4:1. Except for this difference, a similar procedure to that for sample 2-1 was performed, and, accordingly, a solid electrolyte material of sample 2-6 was obtained.

The ionic conductivity of the solid electrolyte material of sample 2-6 was measured in a manner similar to that for sample 1-1. The result was that the ionic conductivity, measured at 22° C., was 0.25 mS/cm.

The X-ray diffraction of the solid electrolyte material of sample 2-6 was measured in a manner similar to that for sample 1-1. The result of the measurement is shown in FIG. 10. The solid electrolyte material of sample 2-6 had a diffraction peak at 13.7° (i.e., in the third range). In addition, the solid electrolyte material of sample 2-6 had a diffraction peak attributable to LiCl. Hence, the solid electrolyte material of sample 2-6 had a third crystalline phase and a fourth crystalline phase.

Sample 2-7

Raw material powders of LiCl and $NbOCl_3$ were prepared in a molar ratio $LiCl:NbOCl_3$ of 5:1. Except for this difference, a similar procedure to that for sample 2-1 was performed, and, accordingly, a solid electrolyte material of sample 2-7 was obtained.

The ionic conductivity of the solid electrolyte material of sample 2-7 was measured in a manner similar to that for sample 1-1. The result was that the ionic conductivity, measured at 22° C., was 0.12 mS/cm.

The X-ray diffraction of the solid electrolyte material of sample 2-7 was measured in a manner similar to that for sample 1-1. The result of the measurement is shown in FIG. 10. The solid electrolyte material of sample 2-7 had a diffraction peak at 13.4° (i.e., in the third range). In addition, the solid electrolyte material of sample 2-7 had a diffraction peak attributable to LiCl. Hence, the solid electrolyte material of sample 2-7 had a third crystalline phase and a fourth crystalline phase.

Sample 2-8

Raw material powders of LiCl and $NbOCl_3$ were prepared in a molar ratio $LiCl:NbOCl_3$ of 6:1. Except for this difference, a similar procedure to that for sample 2-1 was performed, and, accordingly, a solid electrolyte material of sample 2-8 was obtained.

The ionic conductivity of the solid electrolyte material of sample 2-8 was measured in a manner similar to that for sample 1-1. The result was that the ionic conductivity, measured at 22° C., was $8.06 \times 10^{-2}$ mS/cm.

The X-ray diffraction of the solid electrolyte material of sample 2-8 was measured in a manner similar to that for sample 1-1. The result of the measurement is shown in FIG. 10. The solid electrolyte material of sample 2-8 had a diffraction peak at 14.1° (i.e., in the third range). Hence, the solid electrolyte material of sample 2-8 had a third crystalline phase.

Sample 2-9

Raw material powders of LiCl and $NbOCl_3$ were prepared in a molar ratio $LiCl:NbOCl_3$ of 0.9:1. Except for this difference, a similar procedure to that for sample 2-1 was performed, and, accordingly, a solid electrolyte material of sample 2-9 was obtained.

The ionic conductivity of the solid electrolyte material of sample 2-9 was measured in a manner similar to that for sample 1-1. The result was that the ionic conductivity, measured at 22° C., was 5.60 mS/cm.

The X-ray diffraction of the solid electrolyte material of sample 2-9 was measured in a manner similar to that for sample 1-1. The result of the measurement is shown in FIG. 10. The solid electrolyte material of sample 2-9 had a diffraction peak at 13.8° (i.e., in the third range). Hence, the solid electrolyte material of sample 2-9 had a third crystalline phase.

Sample 2-10

Raw material powders of LiCl and $NbOCl_3$ were prepared in a molar ratio $LiCl:NbOCl_3$ of 0.8:1. Except for this difference, a similar procedure to that for sample 2-1 was performed, and, accordingly, a solid electrolyte material of sample 2-10 was obtained.

The ionic conductivity of the solid electrolyte material of sample 2-10 was measured in a manner similar to that for sample 1-1. The result was that the ionic conductivity, measured at 22° ° C., was 2.83 mS/cm.

The X-ray diffraction of the solid electrolyte material of sample 2-10 was measured in a manner similar to that for sample 1-1. The result of the measurement is shown in FIG. 10. The solid electrolyte material of sample 2-10 had a diffraction peak at 13.8° (i.e., in the third range). Hence, the solid electrolyte material of sample 2-10 had a third crystalline phase.

Sample 2-11

Raw material powders of LiCl and $NbOCl_3$ were prepared in a molar ratio $LiCl:NbOCl_3$ of 0.5:1. Except for this difference, a similar procedure to that for sample 2-1 was performed, and, accordingly, a solid electrolyte material of sample 2-11 was obtained.

The ionic conductivity of the solid electrolyte material of sample 2-11 was measured in a manner similar to that for sample 1-1. The result was that the ionic conductivity, measured at 22° C., was 1.20 mS/cm.

The X-ray diffraction of the solid electrolyte material of sample 2-11 was measured in a manner similar to that for sample 1-1. The result of the measurement is shown in FIG. 10. The solid electrolyte material of sample 2-11 had a diffraction peak at 13.8° (i.e., in the third range). Hence, the solid electrolyte material of sample 2-11 had a third crystalline phase.

Sample 2-12

Raw material powders of LiCl and $NbOCl_3$ were prepared in a molar ratio $LiCl:NbOCl_3$ of 0.3:1. Except for this difference, a similar procedure to that for sample 2-1 was performed, and, accordingly, a solid electrolyte material of sample 2-12 was obtained.

The ionic conductivity of the solid electrolyte material of sample 2-12 was measured in a manner similar to that for sample 1-1. The result was that the ionic conductivity, measured at 22° C., was 0.16 mS/cm.

The X-ray diffraction of the solid electrolyte material of sample 2-12 was measured in a manner similar to that for sample 1-1. The result of the measurement is shown in FIG. 10. The solid electrolyte material of sample 2-12 had a diffraction peak at 13.8° (i.e., in the third range). Hence, the solid electrolyte material of sample 2-12 had a third crystalline phase.

Sample 2-13

Raw material powders of LiCl and $NbOCl_3$ were prepared in a molar ratio $LiCl:NbOCl_3$ of 0.2:1. Except for this difference, a similar procedure to that for sample 2-1 was performed, and, accordingly, a solid electrolyte material of sample 2-13 was obtained.

The ionic conductivity of the solid electrolyte material of sample 2-13 was measured in a manner similar to that for sample 1-1. The result was that the ionic conductivity, measured at 22° C., was $3.29 \times 10^{-2}$ mS/cm.

The X-ray diffraction of the solid electrolyte material of sample 2-13 was measured in a manner similar to that for sample 1-1. The result of the measurement is shown in FIG.

10. The solid electrolyte material of sample 2-13 had a diffraction peak at 13.9° (i.e., in the third range). Hence, the solid electrolyte material of sample 2-13 had a third crystalline phase.

Sample 2-14

Raw material powders of LiOH and NbCl$_5$ were prepared in a molar ratio LiOH:NbCl$_5$ of 0.5:1. Except for this difference, a similar procedure to that for sample 2-1 was performed, and, accordingly, a solid electrolyte material of sample 2-14 was obtained.

The ionic conductivity of the solid electrolyte material of sample 2-14 was measured in a manner similar to that for sample 1-1. The result was that the ionic conductivity, measured at 22° C., was 7.70 mS/cm.

Figure 11:
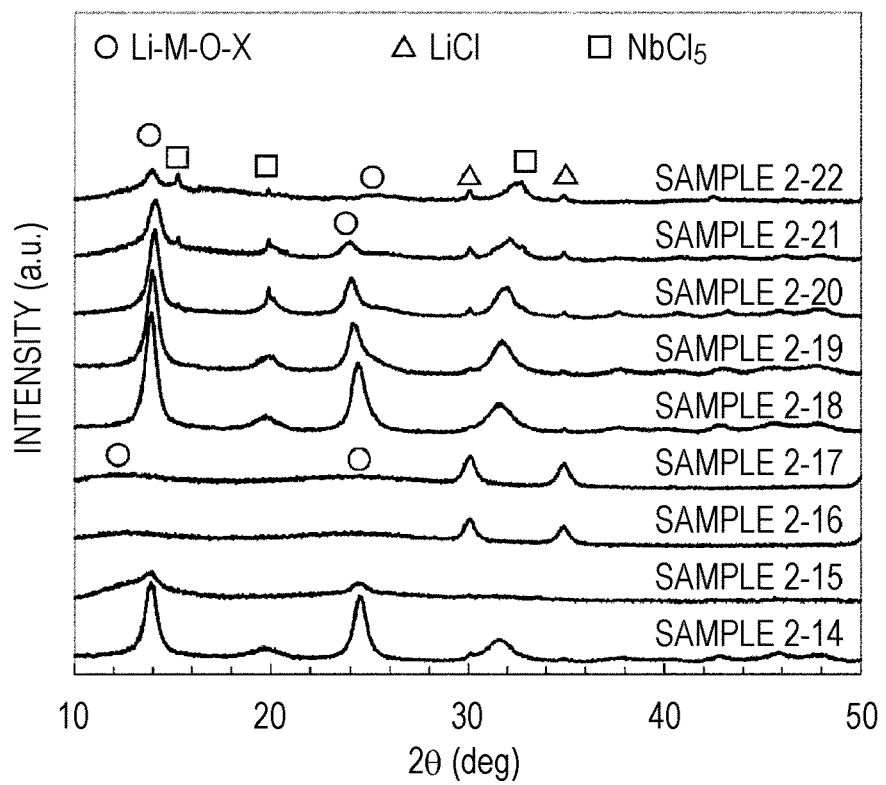
FIG. 11 is a graph illustrating X-ray diffraction patterns of solid electrolyte materials of samples 2-14 to 2-22.

The X-ray diffraction of the solid electrolyte material of sample 2-14 was measured in a manner similar to that for sample 1-1. The result of the measurement is shown in FIG. 11. The solid electrolyte material of sample 2-14 had a diffraction peak at 13.9° (i.e., in the third range). In addition, the solid electrolyte material of sample 2-14 had a diffraction peak attributable to LiCl. Hence, the solid electrolyte material of sample 2-14 had a third crystalline phase and a fourth crystalline phase.

Sample 2-15

Raw material powders of LiCl, Li$_2$O, and NbOCl$_3$ were prepared in a molar ratio LiCl:Li$_2$O:NbOCl$_3$ of 0.5:0.25:1. Except for this difference, a similar procedure to that for sample 2-1 was performed, and, accordingly, a solid electrolyte material of sample 2-15 was obtained.

The ionic conductivity of the solid electrolyte material of sample 2-15 was measured in a manner similar to that for sample 1-1. The result was that the ionic conductivity, measured at 22° C., was 1.75 mS/cm.

The X-ray diffraction of the solid electrolyte material of sample 2-15 was measured in a manner similar to that for sample 1-1. The result of the measurement is shown in FIG. 11. The solid electrolyte material of sample 2-15 had a diffraction peak at 14.0° (i.e., in the third range). Hence, the solid electrolyte material of sample 2-15 had a third crystalline phase.

Sample 2-16

Raw material powders of LiOH and NbCl$_5$ were prepared in a molar ratio LiOH:NbCl$_5$ of 1.6:1. Except for this difference, a similar procedure to that for sample 2-1 was performed, and, accordingly, a solid electrolyte material of sample 2-16 was obtained.

The ionic conductivity of the solid electrolyte material of sample 2-16 was measured in a manner similar to that for sample 1-1. The result was that the ionic conductivity, measured at 22° C., was 0.16 mS/cm.

The X-ray diffraction of the solid electrolyte material of sample 2-16 was measured in a manner similar to that for sample 1-1. The result of the measurement is shown in FIG. 11. The solid electrolyte material of sample 2-16 had a diffraction peak at 12.7° (i.e., in the third range). In addition, the solid electrolyte material of sample 2-16 had a diffraction peak attributable to LiCl. Hence, the solid electrolyte material of sample 2-16 had a third crystalline phase and a fourth crystalline phase.

Sample 2-17

Raw material powders of LiOH and NbCl$_5$ were prepared in a molar ratio LiOH:NbCl$_5$ of 1.8:1. Except for this difference, a similar procedure to that for sample 2-1 was performed, and, accordingly, a solid electrolyte material of sample 2-17 was obtained.

The ionic conductivity of the solid electrolyte material of sample 2-17 was measured in a manner similar to that for sample 1-1. The result was that the ionic conductivity, measured at 22° C., was $5.86 \times 10^{-2}$ mS/cm.

The X-ray diffraction of the solid electrolyte material of sample 2-17 was measured in a manner similar to that for sample 1-1. The result of the measurement is shown in FIG. 11. The solid electrolyte material of sample 2-17 had a diffraction peak at 12.3° (i.e., in the third range). In addition, the solid electrolyte material of sample 2-17 had a diffraction peak attributable to LiCl. Hence, the solid electrolyte material of sample 2-17 had a third crystalline phase and a fourth crystalline phase.

Sample 2-18

Raw material powders of LiOH and NbCl$_5$ were prepared in a molar ratio LiOH:NbCl$_5$ of 0.9:1. Except for this difference, a similar procedure to that for sample 2-1 was performed, and, accordingly, a solid electrolyte material of sample 2-18 was obtained.

The ionic conductivity of the solid electrolyte material of sample 2-18 was measured in a manner similar to that for sample 1-1. The result was that the ionic conductivity, measured at 22° C., was 8.60 mS/cm.

The X-ray diffraction of the solid electrolyte material of sample 2-18 was measured in a manner similar to that for sample 1-1. The result of the measurement is shown in FIG. 11. The solid electrolyte material of sample 2-18 had a diffraction peak at 13.9° (i.e., in the third range). In addition, the solid electrolyte material of sample 2-18 had a diffraction peak attributable to LiCl. Hence, the solid electrolyte material of sample 2-18 had a third crystalline phase and a fourth crystalline phase.

Sample 2-19

Raw material powders of LiOH and NbCl$_5$ were prepared in a molar ratio LiOH:NbCl$_5$ of 0.8:1. Except for this difference, a similar procedure to that for sample 2-1 was performed, and, accordingly, a solid electrolyte material of sample 2-19 was obtained.

The ionic conductivity of the solid electrolyte material of sample 2-19 was measured in a manner similar to that for sample 1-1. The result was that the ionic conductivity, measured at 22° C., was 3.85 mS/cm.

The X-ray diffraction of the solid electrolyte material of sample 2-19 was measured in a manner similar to that for sample 1-1. The result of the measurement is shown in FIG. 11. The solid electrolyte material of sample 2-19 had a diffraction peak at 14.0° (i.e., in the third range). In addition, the solid electrolyte material of sample 2-19 had a diffraction peak attributable to LiCl. Hence, the solid electrolyte material of sample 2-19 had a third crystalline phase and a fourth crystalline phase.

Sample 2-20

Raw material powders of LiOH and NbCl$_5$ were prepared in a molar ratio LiOH:NbCl$_5$ of 0.7:1. Except for this difference, a similar procedure to that for sample 2-1 was performed, and, accordingly, a solid electrolyte material of sample 2-20 was obtained.

The ionic conductivity of the solid electrolyte material of sample 2-20 was measured in a manner similar to that for sample 1-1. The result was that the ionic conductivity, measured at 22° C., was 1.26 mS/cm.

The X-ray diffraction of the solid electrolyte material of sample 2-20 was measured in a manner similar to that for sample 1-1. The result of the measurement is shown in FIG. 11. The solid electrolyte material of sample 2-20 had a diffraction peak at 14.1° (i.e., in the third range). In addition, the solid electrolyte material of sample 2-20 had diffraction peaks attributable to LiCl and $NbCl_5$. Hence, the solid electrolyte material of sample 2-20 had a third crystalline phase and a fourth crystalline phase.

Sample 2-21

Raw material powders of LiOH and $NbCl_5$ were prepared in a molar ratio $LiOH:NbCl_5$ of 0.6:1. Except for this difference, a similar procedure to that for sample 2-1 was performed, and, accordingly, a solid electrolyte material of sample 2-21 was obtained.

The ionic conductivity of the solid electrolyte material of sample 2-21 was measured in a manner similar to that for sample 1-1. The result was that the ionic conductivity, measured at 22° C., was 0.10 mS/cm.

The X-ray diffraction of the solid electrolyte material of sample 2-21 was measured in a manner similar to that for sample 1-1. The result of the measurement is shown in FIG. 11. The solid electrolyte material of sample 2-21 had a diffraction peak at 14.2° (i.e., in the third range). In addition, the solid electrolyte material of sample 2-21 had diffraction peaks attributable to LiCl and $NbCl_5$. Hence, the solid electrolyte material of sample 2-21 had a third crystalline phase and a fourth crystalline phase.

Sample 2-22

Raw material powders of LiOH and $NbCl_5$ were prepared in a molar ratio $LiOH:NbCl_5$ of 0.5:1. Except for this difference, a similar procedure to that for sample 2-1 was performed, and, accordingly, a solid electrolyte material of sample 2-22 was obtained.

The ionic conductivity of the solid electrolyte material of sample 2-22 was measured in a manner similar to that for sample 1-1. The result was that the ionic conductivity, measured at 22° C., was $1.61 \times 10^{-4}$ mS/cm.

The X-ray diffraction of the solid electrolyte material of sample 2-22 was measured in a manner similar to that for sample 1-1. The result of the measurement is shown in FIG. 11. The solid electrolyte material of sample 2-22 had a diffraction peak at 14.0° (i.e., in the third range). In addition, the solid electrolyte material of sample 2-22 had diffraction peaks attributable to LiCl and $NbCl_5$. Hence, the solid electrolyte material of sample 2-22 had a third crystalline phase and a fourth crystalline phase.

Sample 2-23

Raw material powders of LiOH and $NbBr_5$ were prepared in a molar ratio $LiOH:NbBr_5$ of 1:1. Except for this difference, a similar procedure to that for sample 2-1 was performed, and, accordingly, a solid electrolyte material of sample 2-23 was obtained.

The ionic conductivity of the solid electrolyte material of sample 2-23 was measured in a manner similar to that for sample 1-1. The result was that the ionic conductivity, measured at 22° C., was 0.40 mS/cm.

Figure 12:
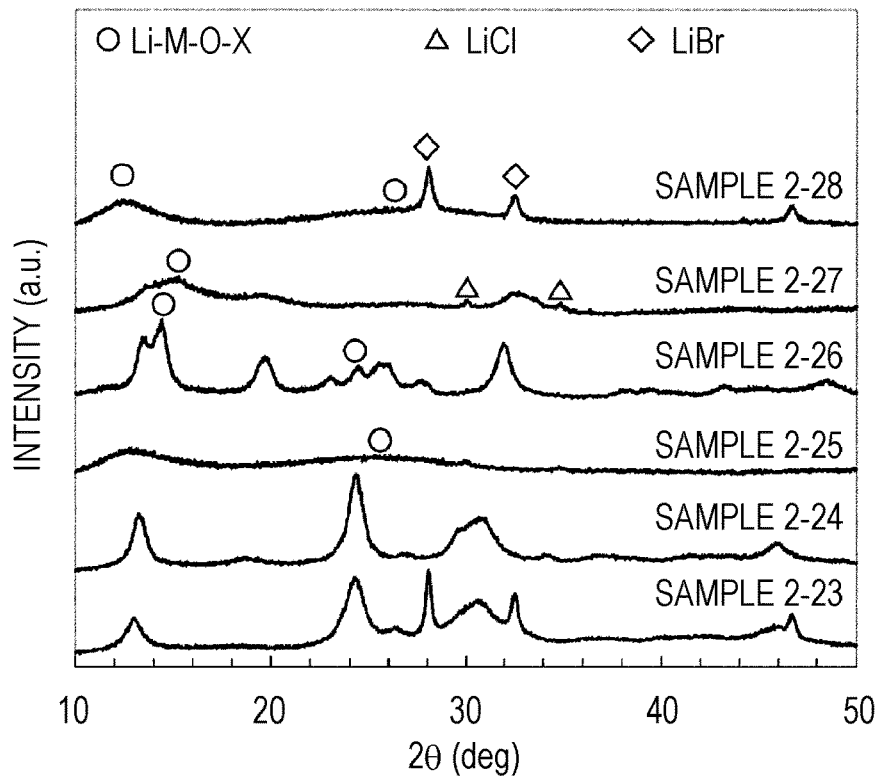
FIG. 12 is a graph illustrating X-ray diffraction patterns of solid electrolyte materials of samples 2-23 to 2-28.

The X-ray diffraction of the solid electrolyte material of sample 2-23 was measured in a manner similar to that for sample 1-1. The result of the measurement is shown in FIG. 12. The solid electrolyte material of sample 2-23 had a diffraction peak at 13.0° (i.e., in the third range). In addition, the solid electrolyte material of sample 2-23 had a diffraction peak attributable to LiBr. Hence, the solid electrolyte material of sample 2-23 had a third crystalline phase and a fourth crystalline phase.

Sample 2-24

Raw material powders of LiOH, $NbCl_5$, and $NbBr_5$ were prepared in a molar ratio $LiOH:NbCl_5:NbBr_5$ of 1:0.5:0.5. Except for this difference, a similar procedure to that for sample 2-1 was performed, and, accordingly, a solid electrolyte material of sample 2-24 was obtained.

The ionic conductivity of the solid electrolyte material of sample 2-24 was measured in a manner similar to that for sample 1-1. The result was that the ionic conductivity, measured at 22° C., was 0.87 mS/cm.

The X-ray diffraction of the solid electrolyte material of sample 2-24 was measured in a manner similar to that for sample 1-1. The result of the measurement is shown in FIG. 12. The solid electrolyte material of sample 2-24 had a diffraction peak at 13.3° (i.e., in the third range). In addition, the solid electrolyte material of sample 2-24 had a diffraction peak attributable to LiCl. Hence, the solid electrolyte material of sample 2-24 had a third crystalline phase and a fourth crystalline phase.

Sample 2-25

Raw material powders of LiOH and $TaCl_5$ were prepared in a molar ratio $LiOH:TaCl_5$ of 1:1. Except for this difference, a similar procedure to that for sample 2-1 was performed, and, accordingly, a solid electrolyte material of sample 2-25 was obtained.

The ionic conductivity of the solid electrolyte material of sample 2-25 was measured in a manner similar to that for sample 1-1. The result was that the ionic conductivity, measured at 22° C., was 5.20 mS/cm.

The X-ray diffraction of the solid electrolyte material of sample 2-25 was measured in a manner similar to that for sample 1-1. The result of the measurement is shown in FIG. 12. The solid electrolyte material of sample 2-25 had a diffraction peak at 12.8° (i.e., in the third range). In addition, the solid electrolyte material of sample 2-25 had a diffraction peak attributable to LiCl. Hence, the solid electrolyte material of sample 2-25 had a third crystalline phase and a fourth crystalline phase.

Sample 2-26

Raw material powders of LiOH and $TaCl_5$ were prepared in a molar ratio $LiOH:TaCl_5$ of 0.9:1. Except for this difference, a similar procedure to that for sample 2-1 was performed, and, accordingly, a solid electrolyte material of sample 2-26 was obtained.

The ionic conductivity of the solid electrolyte material of sample 2-26 was measured in a manner similar to that for sample 1-1. The result was that the ionic conductivity, measured at 22° C., was 7.68 mS/cm.

The X-ray diffraction of the solid electrolyte material of sample 2-26 was measured in a manner similar to that for sample 1-1. The result of the measurement is shown in FIG. 12. The solid electrolyte material of sample 2-26 had a diffraction peak at 14.4° (i.e., in the third range). Hence, the solid electrolyte material of sample 2-26 had a third crystalline phase.

Sample 2-27

Raw material powders of $Li_2O$ and $TaCl_5$ were prepared in a molar ratio $Li_2O:TaCl_5$ of 1:1. Except for this difference, a similar procedure to that for sample 2-1 was performed, and, accordingly, a solid electrolyte material of sample 2-27 was obtained.

The ionic conductivity of the solid electrolyte material of sample 2-27 was measured in a manner similar to that for sample 1-1. The result was that the ionic conductivity, measured at 22° C., was 1.40 mS/cm.

The X-ray diffraction of the solid electrolyte material of sample 2-27 was measured in a manner similar to that for sample 1-1. The result of the measurement is shown in FIG. 12. The solid electrolyte material of sample 2-27 had a diffraction peak at 15.3° (i.e., in the third range). In addition, the solid electrolyte material of sample 2-27 had a diffraction peak attributable to LiCl. Hence, the solid electrolyte material of sample 2-27 had a third crystalline phase and a fourth crystalline phase.

Sample 2-28

Raw material powders of LiOH and $TaBr_5$ were prepared in a molar ratio $LiOH:TaBr_5$ of 1:1. Except for this difference, a similar procedure to that for sample 2-1 was performed, and, accordingly, a solid electrolyte material of sample 2-28 was obtained.

The ionic conductivity of the solid electrolyte material of sample 2-28 was measured in a manner similar to that for sample 1-1. The result was that the ionic conductivity, measured at 22° C., was 0.33 mS/cm.

The X-ray diffraction of the solid electrolyte material of sample 2-28 was measured in a manner similar to that for sample 1-1. The result of the measurement is shown in FIG. 12. The solid electrolyte material of sample 2-28 had a diffraction peak at 12.5° (i.e., in the third range). In addition, the solid electrolyte material of sample 2-28 had a diffraction peak attributable to LiBr. Hence, the solid electrolyte material of sample 2-28 had a third crystalline phase and a fourth crystalline phase.

Table 2 shows the element species of M and X, the values of x and y, and the measurement results of the solid electrolyte materials of samples 2-1 to 2-22. Table 3 shows the element species of M and X, the values of x and y, and the measurement results of the solid electrolyte materials of samples 2-23 to 2-28.

TABLE 2

| | M | X | x | y | Diffraction peak angle in third range | Ionic conductivity (mS/cm) |
|---|---|---|---|---|---|---|
| Sample 2-1 | Nb | Cl | 1.0 | 1.0 | 13.9° | 5.70 |
| Sample 2-2 | Nb | Cl | 1.1 | 1.0 | 13.9° | 5.23 |
| Sample 2-3 | Nb | Cl | 1.5 | 1.0 | 13.9° | 3.25 |
| Sample 2-4 | Nb | Cl | 2.0 | 1.0 | 14.0° | 1.73 |
| Sample 2-5 | Nb | Cl | 3.0 | 1.0 | 14.0° | 0.44 |
| Sample 2-6 | Nb | Cl | 4.0 | 1.0 | 13.7° | 0.25 |
| Sample 2-7 | Nb | Cl | 5.0 | 1.0 | 13.4° | 0.12 |
| Sample 2-8 | Nb | Cl | 6.0 | 1.0 | 14.1° | $8.06 \times 10^{-2}$ |
| Sample 2-9 | Nb | Cl | 0.9 | 1.0 | 13.8° | 5.60 |
| Sample 2-10 | Nb | Cl | 0.8 | 1.0 | 13.8° | 2.83 |
| Sample 2-11 | Nb | Cl | 0.5 | 1.0 | 13.8° | 1.20 |
| Sample 2-12 | Nb | Cl | 0.3 | 1.0 | 13.8° | 0.16 |
| Sample 2-13 | Nb | Cl | 0.2 | 1.0 | 13.9° | $3.29 \times 10^{-2}$ |
| Sample 2-14 | Nb | Cl | 1.0 | 1.0 | 13.9° | 7.70 |
| Sample 2-15 | Nb | Cl | 1.0 | 1.25 | 14.0° | 1.75 |
| Sample 2-16 | Nb | Cl | 1.6 | 1.6 | 12.7° | 0.16 |
| Sample 2-17 | Nb | Cl | 1.8 | 1.8 | 12.3° | $5.86 \times 10^{-2}$ |
| Sample 2-18 | Nb | Cl | 0.9 | 0.9 | 13.9° | 8.60 |
| Sample 2-19 | Nb | Cl | 0.8 | 0.8 | 14.0° | 3.85 |
| Sample 2-20 | Nb | Cl | 0.7 | 0.7 | 14.1° | 1.26 |
| Sample 2-21 | Nb | Cl | 0.6 | 0.6 | 14.2° | 0.10 |
| Sample 2-22 | Nb | Cl | 0.5 | 0.5 | 14.0° | $1.61 \times 10^{-4}$ |

TABLE 3

| | M | X | x | y | Diffraction peak angle in third range | Ionic conductivity (mS/cm) |
|---|---|---|---|---|---|---|
| Sample 2-23 | Nb | Br | 1.0 | 1.0 | 13.0° | 0.40 |
| Sample 2-24 | Nb | Br, Cl | 1.0 | 1.0 | 13.3° | 0.87 |
| Sample 2-25 | Ta | Cl | 1.0 | 1.0 | 12.8° | 5.20 |
| Sample 2-26 | Ta | Cl | 0.9 | 0.9 | 14.4° | 7.68 |
| Sample 2-27 | Ta | Cl | 2.0 | 1.0 | 15.3° | 1.40 |
| Sample 2-28 | Ta | Br | 1.0 | 1.0 | 12.5° | 0.33 |

Discussion

As is apparent from Table 2 and Table 3, the solid electrolyte materials of samples 2-1 to 2-28 have a high ionic conductivity of greater than or equal to $1 \times 10^{-4}$ mS/cm at room temperature. The solid electrolyte materials of samples 2-1 to 2-28 have a higher ionic conductivity than the solid electrolyte material of sample 1-8.

As is apparent from a comparison of samples 2-1 to 2-4 and 2-9 to 2-11 with samples 2-5 to 2-8, 2-12, and 2-13, when the value of x is greater than or equal to 0.5 and less than or equal to 2.0, the solid electrolyte material has a higher ionic conductivity. As is apparent from a comparison of samples 2-1 to 2-3, 2-9, and 2-10 with samples 2-4 to 2-8, 2-12, and 2-13, when the value of x is greater than or equal to 0.8 and less than or equal to 1.5, the ionic conductivity is even higher. As is apparent from a comparison of samples 2-1, 2-2, and 2-9 with samples 2-3 and 2-10, when the value of x is greater than or equal to 0.9 and less than or equal to 1.1, the ionic conductivity is even higher.

As is apparent from a comparison between samples 2-1, 2-14, and 2-16 to 2-19, in instances where the value of x is equal to the value of y, when the values of x and y are greater than or equal to 0.8 and less than or equal to 1.0, the solid electrolyte material has a higher ionic conductivity.

As is apparent from a comparison of samples 2-1 and 2-24 with sample 2-23 or a comparison of sample 2-25 with sample 2-28, in instances where X includes Cl, the solid electrolyte material has a higher ionic conductivity.

As is apparent from a comparison of samples 2-1, 2-4, 2-18, and 2-23 with samples 2-25, 2-27, 2-26, and 2-28, in instances where M includes Nb, the solid electrolyte materials has a higher ionic conductivity.

The solid electrolyte material of sample 2-1 maintained high lithium ion conductivity in an expected operating temperature range of the battery.

The battery of sample 2-1 was charged and discharged at room temperature.

As described above, solid electrolyte materials according to the present disclosure have high lithium ion conductivity and are, therefore, suitable for providing batteries having excellent charge-discharge characteristics.

Solid electrolyte materials of the present disclosure are utilized, for example, for all-solid-state lithium ion secondary batteries.

What is claimed is:

1. A solid electrolyte material consisting essentially of Li, M, O, and X, wherein:
    M is at least one element selected from the group consisting of Nb and Ta,
    X is at least one element selected from the group consisting of Cl, Br, and I,
    the solid electrolyte material includes Nb, and
    a total amount of Li, M, O, and X to a total amount of all elements constituting the solid electrolyte material is equal to or greater than 95%.

2. The solid electrolyte material according to claim 1, wherein X is at least one element selected from the group consisting of Cl and Br.

3. The solid electrolyte material according to claim 1, wherein X includes Cl.

4. The solid electrolyte material according to claim 1, wherein the solid electrolyte material has a first crystalline phase, the first crystalline phase corresponding to a peak in an X-ray diffraction pattern of the solid electrolyte material obtained by an X-ray diffraction measurement with Cu-K$\alpha$, radiation, the peak existing in at least one of a first range or a second range, the first range being a range of a diffraction angle 2θ of greater than or equal to 12.9° and less than or equal to 14.1°, and the second range being a range of the diffraction angle 2θ of greater than or equal to 24.0° and less than or equal to 25.8°.

5. The solid electrolyte material according to claim 4, wherein the peak exists in both the first range and the second range.

6. The solid electrolyte material according to claim 4, wherein the solid electrolyte material further has a second crystalline phase, the second crystalline phase being different from the first crystalline phase.

7. The solid electrolyte material according to claim 1, wherein a molar ratio Li/M is greater than or equal to 1.0 and less than or equal to 2.0.

8. The solid electrolyte material according to claim 1, wherein a molar ratio O/X is greater than or equal to 0.1 and less than or equal to 0.25.

9. The solid electrolyte material according to claim 1, wherein the solid electrolyte material has a third crystalline phase, the third crystalline phase corresponding to a peak in the X-ray diffraction pattern of the solid electrolyte material obtained by the X-ray diffraction measurement with Cu-K$\alpha$, radiation, the peak existing in a third range, and the third range being a range of a diffraction angle 2θ of greater than or equal to 12.3° and less than or equal to 15.3°.

10. The solid electrolyte material according to claim 9, wherein the solid electrolyte material further has a fourth crystalline phase, the fourth crystalline phase being different from the third crystalline phase.

11. The solid electrolyte material according to claim 1, wherein the solid electrolyte material is represented by composition formula (1) below, $$Li_xMO_yX_{(5+x-2y)} \qquad (1)$$

wherein the following relationships are satisfied:

$$0.1 < x < 7.0, \text{ and}$$

$$0.4 < y < 1.9.$$

12. The solid electrolyte material according to claim 11, wherein the following relationships are satisfied:

$$0.2 \leq x \leq 6.0, \text{ and}$$

$$0.5 \leq y \leq 1.8.$$

13. The solid electrolyte material according to claim 12, wherein a relationship of $0.5 \leq x \leq 2.0$ is satisfied.

14. The solid electrolyte material according to claim 13, wherein a relationship of $0.9 \leq x \leq 1.1$ is satisfied.

15. A battery comprising:
    a positive electrode;
    a negative electrode; and
    an electrolyte layer disposed between the positive electrode and the negative electrode, wherein
    at least one selected from the group consisting of the positive electrode, the negative electrode, and the electrolyte layer includes the solid electrolyte material according to claim 1.

16. The solid electrolyte material according to claim 1, wherein the solid electrolyte material consists of Li, M, O, and X.

17. The solid electrolyte material according to claim 1, wherein the solid electrolyte material consists of Li, Nb, O, and Cl.

* * * * *